US009207911B2

(12) United States Patent
Ross

(10) Patent No.: US 9,207,911 B2
(45) Date of Patent: Dec. 8, 2015

(54) MODULAR UNCERTAINTY RANDOM VALUE GENERATOR AND METHOD

(75) Inventor: Patrick D. Ross, Sunnyvale, CA (US)

(73) Assignee: CASSY HOLDINGS LLC, South Jordan, UT (US)

(*) Notice: Subject to any disclaimer, the term of this patent is extended or adjusted under 35 U.S.C. 154(b) by 1173 days.

(21) Appl. No.: 12/580,965

(22) Filed: Oct. 16, 2009

(65) Prior Publication Data

US 2011/0029588 A1     Feb. 3, 2011

Related U.S. Application Data

(63) Continuation-in-part of application No. 12/533,179, filed on Jul. 31, 2009, now abandoned.

(51) Int. Cl.
*G06F 1/02*     (2006.01)
*G06F 7/58*     (2006.01)

(52) U.S. Cl.
CPC . *G06F 7/58* (2013.01); *G06F 7/582* (2013.01); *G06F 7/584* (2013.01); *G06F 7/588* (2013.01)

(58) Field of Classification Search
None
See application file for complete search history.

(56) References Cited

U.S. PATENT DOCUMENTS

| 5,323,464 | A | * | 6/1994 | Elander et al. ............... 713/191 |
| 6,278,780 | B1 | * | 8/2001 | Shimada ........................ 380/47 |
| 6,678,853 | B1 | | 1/2004 | Brummel |
| 7,269,261 | B1 | * | 9/2007 | Jennings ....................... 380/286 |
| 7,861,077 | B1 | * | 12/2010 | Gallagher, III ............... 713/155 |
| 8,180,048 | B2 | * | 5/2012 | Singanamala ................. 380/44 |
| 2002/0120669 | A1 | | 8/2002 | Yanovsky |
| 2002/0199108 | A1 | * | 12/2002 | Chuang et al. ................ 713/176 |

(Continued)

FOREIGN PATENT DOCUMENTS

| DE | 3400035 A1 | 7/1984 |
| FR | 2829643 A1 | 3/2003 |

(Continued)

OTHER PUBLICATIONS

Elaine Barker et al—Recommendation for Random Number Generation Using Deterministic Random Bit Generators. Via Web at http://discovery.coloradocollege.edu/catalog/record/b1682911.

(Continued)

*Primary Examiner* — Ilwoo Park
*Assistant Examiner* — Aurangzeb Hassan
(74) *Attorney, Agent, or Firm* — JP Webb; Jason P. Webb; Danny Y. H. Cheng

(57) ABSTRACT

A system and method of generating a one-way function and thereby producing a random-value stream. Steps include: providing a plurality of memory cells addressed according to a domain value wherein any given domain value maps to all possible range values; generating a random domain value associated with one of the memory cells; reading a data value associated with the generated random domain value; generating dynamically enhanced data by providing an additional quantity of data; removing suspected non-random portions thereby creating source data; validating the source data according to a minimum randomness requirement, thereby creating a validated source data; and integrating the validated source data with the memory cell locations using a random edit process that is a masking, a displacement-in-time, a chaos engine, an XOR, an overwrite, an expand, a remove, a control plane, or an address plane module. The expand module inserts a noise chunk.

19 Claims, 17 Drawing Sheets

(56) References Cited

U.S. PATENT DOCUMENTS

| | | |
|---|---|---|
| 2004/0158591 A1* | 8/2004 | Crispin .................... 708/250 |
| 2005/0110399 A1 | 5/2005 | Blakley et al. |
| 2006/0005046 A1* | 1/2006 | Hars ........................ 713/191 |
| 2006/0047735 A1* | 3/2006 | Nunes ....................... 708/250 |
| 2006/0053112 A1* | 3/2006 | Chitkara et al. ............ 707/9 |
| 2007/0195952 A1* | 8/2007 | Singanamala ............... 380/37 |
| 2007/0211890 A1 | 9/2007 | Gebotys |
| 2007/0266067 A1 | 11/2007 | Matsui |
| 2008/0033960 A1* | 2/2008 | Banks et al. ............... 707/9 |
| 2009/0259705 A1 | 10/2009 | Kailas et al. |
| 2010/0070549 A1* | 3/2010 | Nagaraj .................... 708/254 |

FOREIGN PATENT DOCUMENTS

| | | |
|---|---|---|
| KR | 1020070114190 A | 5/2009 |
| WO | WO2007148244 A1 | 12/2007 |

OTHER PUBLICATIONS

Terry Ritter—"The Efficient Generation of Cryptographic Confusion Sequences" Cryptologia, US Military Academy, West Point NY,US. vol. 15, No. 2, Apr. 1, 1991 pp. 81-139, XP000647031, ISSN: 0161-1194, via web at http://www.ciphersbyritter.com/ARTS/CRNG2ART.HTM.

* cited by examiner

MODULAR UNCERTAINTY RANDOM VALUE GENERATOR AND METHOD

CROSS-REFERENCE TO RELATED APPLICATIONS

This invention is a continuation in part of and claims priority, under 35 U.S.C. §120, to the U.S. patent application Ser. No. 12/533,179 to Ross filed on 31 Jul. 2009, which is incorporated by reference herein in its entirety.

BACKGROUND OF THE INVENTION

1. Field of the Invention

The present invention relates to methods and systems for generating random numbers, specifically to modular methods and systems for generating random number streams.

2. Description of the Related Art

Many applications require random values as part of their internal processing. Some of these applications have simple requirements like a uniform distribution of values, reproducibility from a given seed value, and very long cycles before they repeat. To that end, many papers and books describe good hardware and software functions that provide these classic random value generators. The attributes of classic random value generators remain both useful and problematic. Before addressing any shortcomings of current random value generators, we must first review how these generators work.

There exists a number of properties common to all classic random value generators, whether they be hardware or software based. The cornerstone of classic random value generators is the use of static random functions. Each of these functions processes the current non-zero data value into the next random value in the sequence. The subsequent processing of each new value creates the random sequence. Assuming that a good function is used, the random sequence will pass almost all known statistical tests for randomness.

Numerous random functions have been tested and published. Most of these published functions produce a limited sequence of values before repeating the same sequence of random values. These brief cycle lengths may be too short to be compatible with many applications. In hardware, the random functions are most often described as Linear Feedback Shift Registers (LFSR). Though fewer software functions exist, a number of established functions are available for the designer to use in new applications. Also, most software random functions share the same short cycle attribute.

Whether passing or failing, cycle length proves just as important as statistical testing. Combining multiple published functions in a non-linear manner is the most common way to increase cycle length. The function-based random value generators are correctly called pseudorandom generators and remain easy to "crack" (invert). Cracking a random value generator allows an attacker to anticipate each of the values in the sequence. As a rule of thumb, doubling the classic random function complexity has the effect of squaring the effort required to crack it. As the speed of hardware and therefore computers increases, the battle becomes an arms race between the designer of random value generators and the cracker wishing to break them.

Embracing this rule of thumb, hardware designers adopt evermore complex random value generator functions. The struggle between the designer and cracker persists because the function driven paradigm is inevitably incomplete. The cost to create, test, and deploy new random value generators is thereby open-ended, because each new design is destined to become obsolete. Subsequently, higher recurring chip costs translate directly into product costs. The endpoint along this path is unknown, so a designer cannot anticipate how long their newest function will prove safe from cracking.

The costs of increasing function complexity are manifested in multiple ways. As noted above, the hardware arms race persists as an inevitably incomplete problem. Each new jump in hardware technology requires a new corresponding generator design in order to stay ahead of the crackers. This escalating cost forces many application designers to forgo the hardware-based solution. To cut system cost, many application designers resort to software-based random value generators. Often the process of transitioning to a software solution either slows performance unacceptably or increases CPU costs. While the recurring costs are lower without dedicated silicon, the software implementation taxes overall system performance. As the software complexity increases, performance inversely decreases.

In an effort to resist cracking, many designers resort to secret (non-public) designs. Development in secrecy necessitates limited testing, review, or reuse. Unfortunately, secret development guarantees a limited return on investment because low volume of a given design always carries higher cost per unit. Furthermore, secrecy only sustains the integrity of these designs until someone obtains a hardware or software example.

The final weakness to these classic functions stems from a simple immutable fact: each random function produces its own random sequence. Stated another way, there is a one-to-one correspondence between the random function and the unique sequence of values it produces. That sequence acts like a "melody" with respect to its generating function. A random "melody" is defined as both the values and the order of those values as they are produced. The seed value only defines where the "melody" starts.

All classic random value generators use a scalar value (starting non-zero seed) to index the point at which their unique "melody" begins. Since classic random value generators are static function-based constructs, the seed value must be protected because it acts as the key to define the start of the pseudorandom sequence. In most cases, the size of the seed value is used to indicate the overall cycle length. All hardware and most software based classic random value generators require a non-zero seed value to start generating random values. In almost all cases, a zero value seed will fail to generate any random stream.

In a futile effort to resist cracking, many designers resort to secret (non-public) designs. Development in secrecy necessitates limited testing, review, or reuse. Unfortunately, secret development guarantees a limited return on investment because low volume of a given design always carries higher cost per unit. Furthermore, secrecy only sustains the integrity of these designs until someone obtains a hardware or software example. What is needed is a true random value generator, one that implements a true one way function, resulting in a random stream of values that is non-deterministic and/or a method or system that solves one or more of the problems described herein and/or one or more problems that may come to the attention of one skilled in the art upon becoming familiar with this specification.

SUMMARY OF THE INVENTION

The present invention has been developed in response to the present state of the art, and in particular, in response to the problems and needs in the art that have not yet been fully solved by currently available random number generators. Accordingly, the present invention has been developed to provide a method and/or a system of generating random numbers having enhanced characteristics.

In one embodiment, there is a method of generating a modular one-way function in a device and thereby producing a random-value stream for use in a device that can benefit from a random-value stream and/or a computer-readable medium having computer-executable instructions for performing a method of using a device to generate a random-value stream, the instructions comprising one or more of the steps of: providing a plurality of edit modules each configured to transform values; indexing the plurality of edit modules; providing an instruction stream, wherein the instruction stream includes a random-value stream resulting from a one-way function; providing a value stream, including a series of values; selecting a value from the value stream, thereby generating a selected value; selecting, by use of a computing device, one of the plurality of edit modules according to a logical association between an instruction stream value and the index; transforming the selected value to a transformed value by operation of the selected edit module; repeating one or more steps described above thereby generating a random-value stream.

The plurality of edit modules may include a function and/or associated seed vector and/or further comprising the step of incrementing the seed vector when the function is utilized to transform values. The plurality of edit modules may include only functions and/or associated seed vectors and/or may further comprise the step of incrementing each associated seed vector when each function is utilized to transform values.

The step of indexing may include assigning each of the plurality of edit modules a memory cell that may be addressed according to a domain value wherein any given domain value maps to all possible range values.

The instruction stream may be an output of one or more steps described above performed by a different module.

In one embodiment, one of the edit modules may include performance of one or more previously described steps by a different module.

There may be a step of restricting the selectable edit modules to a smaller subset of the total pool of available edit modules. The step of restricting may include randomly selecting a limited number of edit modules thereby generating a subset and generating data sufficient to limit selection of edit modules to those of the subset.

In one embodiment, there may be a step of repeating a selection step to select a second edit module and transforming the transformed value by operation of the second edit module thereby forming a multi-transformed value by operation of stacked edit modules.

There may be a random value generation system configured to automatically generate a stream of random values usable by a device that may benefit from such, the system comprising one or more of the following: a plurality of indexed edit modules each configured to transform a value; an instruction stream module configured to provide a random-value stream resulting from a one-way function; a value stream module configured to provide a series of values; a computing device in communication with each of the plurality of indexed edit modules, the instruction stream module, and the value stream module and configured to select one of the plurality of indexed edit modules according to a logical association between a value of the instruction stream and the index and instruct the edit module to transform a value of the value stream module.

In one embodiment, there is a new genome of random value generators based on a number of new technologies, including but not limited to one or more of the following modules:

Uncertainty Function—One Way Function
Random Edit Processes
Displacement-In-Time
Dynamic Evolution Of Session Data
Dynamic Seed Functions
Full Dynamic Mutation Embodiments of this new genome of random value generators excel as a replacement for one, several, or all classic random value generators, in one, several, or all known applications. Whenever a current application uses a classic random value generator, an embodiment of a new uncertainty random value generator may be configured replace it.

In another embodiment, all of these new techniques come together as an open-ended architectural solution for generating random values. Such an architectural model scales from very low cost products to extremely demanding applications, based on their random data requirements.

In still another embodiment, there is a method of generating a one-way function in a device and thereby producing a random-value stream for use in the device that can benefit from a random-value stream, comprising the steps of: a) providing a plurality of memory cells addressed according to a domain value wherein any given domain value maps to all possible range values; b) generating a random domain address value associated with one of the plurality of memory cells; c) reading a data value associated with the generated random domain value; and, d) repeating steps b) through c) thereby providing a random-value stream. The method generating a one-way function and thereby producing a random-value stream additionally comprises the step of providing a means to decouple the random-value stream from the original memory cell locations and data values thereby producing a non-deterministic random-value stream.

In still another embodiment, a correctly implemented example of the uncertainty genome will be harder to invert than the same cost classic genome generator, assuming the session data (to be defined later) has not been compromised. This means that everybody can use the same public hardware/software yet still have the same resistance from cracking.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order for the advantages of the invention to be readily understood, a more particular description of the invention briefly described above will be rendered by reference to specific embodiments that are illustrated in the appended drawing(s). It is noted that the drawings of the invention are not to scale. The drawings are mere schematics representations, not intended to portray specific parameters of the invention. Understanding that these drawing(s) depict only typical embodiments of the invention and are not, therefore, to be considered to be limiting its scope, the invention will be described and explained with additional specificity and detail through the use of the accompanying drawing(s), in which.

DETAILED DESCRIPTION OF THE INVENTION

Figure 1:
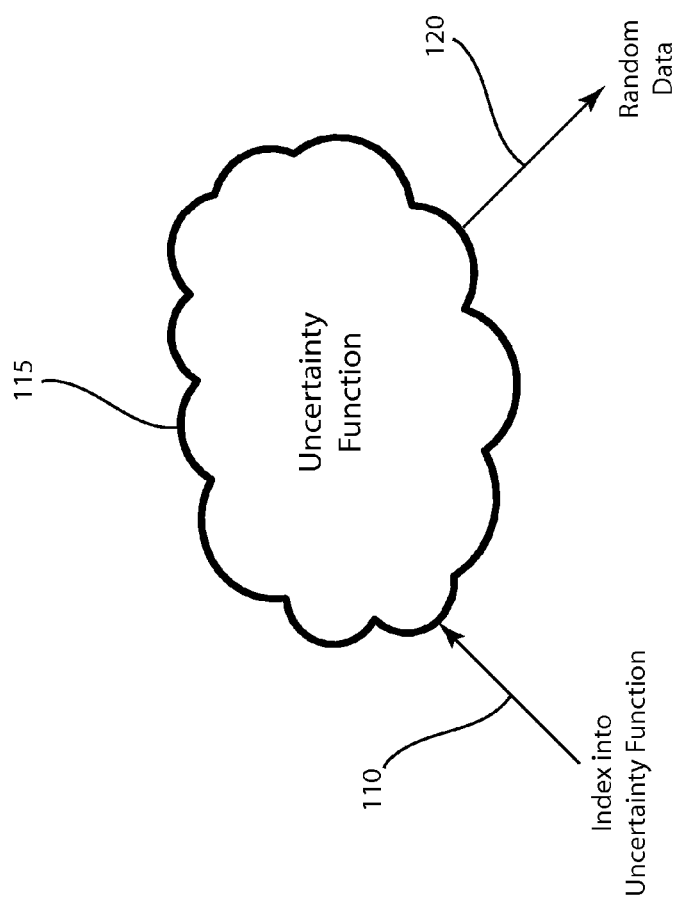
FIG. 1 is a diagram showing a simple abstraction of a one-way function where random values are generated by pulling data values from an uncertainty function according to one embodiment of the invention.

For the purposes of promoting an understanding of the principles of the invention, reference will now be made to the exemplary embodiments illustrated in the drawing(s), and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

Reference throughout this specification to an "embodiment," an "example" or similar language means that a particular feature, structure, characteristic, or combinations thereof described in connection with the embodiment is included in at least one embodiment of the present invention. Thus, appearances of the phrases an "embodiment," an "example," and similar language throughout this specification may, but do not necessarily, all refer to the same embodiment, to different embodiments, or to one or more of the figures. Additionally, reference to the wording "embodiment," "example" or the like, for two or more features, elements, etc. does not mean that the features are necessarily related, dissimilar, the same, etc.

Each statement of an embodiment, or example, is to be considered independent of any other statement of an embodiment despite any use of similar or identical language characterizing each embodiment. Therefore, where one embodiment is identified as "another embodiment," the identified embodiment is independent of any other embodiments characterized by the language "another embodiment." The features, functions, and the like described herein are considered to be able to be combined in whole or in part one with another as the claims and/or art may direct, either directly or indirectly, implicitly or explicitly.

As used herein, "comprising," "including," "containing," "is," "are," "characterized by," and grammatical equivalents thereof are inclusive or open-ended terms that do not exclude additional unrecited elements or method steps. "Comprising" is to be interpreted as including the more restrictive terms "consisting of" and "consisting essentially of."

As students of Algebra, we are taught the sanctity of the equal sign with each subsequent math class continuing to reiterate this point. In order to keep both sides equal, you must modify the left side of the equation in the same manner that you modified the right side of the equation. We are all taught, tested, graded and promoted by the sacred preservation of the equal sign. Thus, our common math training makes the idea of a one-way function difficult to conceive.

By definition, a one-way function can be computed very easily forward but is very hard to invert. Extensive definitions of one-way functions are defined in many textbooks as well as online.

The example most often given is a trapdoor one-way function, the product of two very large prime numbers. Though the product is easy to compute, the factoring of this product remains extremely difficult to compute. The factoring of the product of two large prime numbers falls into the class of "provably difficult" problems. In other words, the term "provably difficult" presents a benchmark reflecting the difficulty of inverting such a function. Given an 800-digit prime number times a 900-digit prime, you can imagine the difficulty of factoring this product into the original two prime numbers.

The old standard of "provably difficult" is not good enough. The real goal should be a useful, true one-way function; one that cannot be inverted. To date, no such function has been found. The sanctity of the equal sign holds us in her grip, as we are stymied by our common math training. The one-way function is known as a math problem, yet the solution comes from computer science.

Specifically, we move to the object paradigm of programming. An abstraction is a set of operational requirements, which contains no definition of the implementation details. Any implementation meeting these requirements is a member of the abstracted class. These two simple sentences give us the means to break the hold of the equal sign.

We start by defining a random value generator abstraction as a class that produces random values. This generic base class is the starting point of the solution. Next, we return to those published, classic random functions, which produce random values. Each published function implementation would be a member of the above, abstracted class. So far, nothing is new. Each of these versions of this abstraction has all the same issues, as classic, random value generators.

Changing the abstraction implementation, instead of using a function to compute random values, we pull data values from a Data Pool (memory hierarchy). If the data in the pool is random to start with, and the pool is large enough, then the abstraction will produce a random stream, which overcomes all known shortcoming of classic random functions.

This version of the abstraction is a true one-way function up to the size of the Data Pool. Unless you have an exact copy of the data in the pool, you cannot invert this function, because it is not really a typical function. The abstraction looks and acts like a function but does not include other characteristic of a function. This is referred to as the Uncertainty Function, and is the simplest embodiment obtainable. FIG. 1 is a diagram showing a simple abstraction of a one-way function where random values 120 are generated by pulling 110 data values from a data pool 115 according to this simple embodiment of the invention. It can be easily implemented in either hardware (silicon) or software.

This simple, data driven Uncertainty Function can emulate, (up to the data pool size 115), all known classic random value functions, plus all other random sequences. Each unique instance of data pool 115 gives a unique data stream. The same data pool 115 gives a unique data stream for each unique addressing methodology used to access the Data Pool 115.

Given one copy of good data, the same data loaded into memory in the same order will produce the same sequence each time if the data is pulled from the data pool in the same manner. If that same data is loaded into memory in a different order each time, then the sequence produced will also be different each time. With a significant quantity of data, this Uncertainty Function can produce an almost unlimited number of random sequences from the same data.

Classic random value generators are susceptible to cracking because they are function-based with one unique "melody", while this version of the Uncertainty Function is resistance to cracking because it is data driven and has no unique "melody". Techniques for cracking random value generators implicitly assume that the random value generators are implemented as a static function with a singular "melody". However, what happens to these cracking techniques if there is no underlying function generating the random values?

Pulling data from a Data Pool is as an extremely low cost solution for generating random values. In fact, it would be very hard to find a less expensive means to produce random data. Uncertainty random value generators invite the same public silicon/software solutions to be installed in a wide range of products. The resulting cost reduction will ripple across many products.

Applications requiring small amounts (Data Pool size or less) of random data could use this Uncertainty Function as a complete solution. However, before doing so, you must understand the dangers of linear addressing, the risk of the Data Paradox, and stale Session Data. These problems will be discussed later after Source Data and Session Data are described.

The usefulness of this one-way function manifests itself in many different ways. Henceforth, this one-way function is referred to as the Uncertainty Function. The random values within memory become a "pool of uncertainty". Thus, whenever you need any non-deterministic values within the design, you go to the pool to obtain them. Not only does it produce non-invertible random data streams, it can also be used to remove the "melody" found in classic pseudo random generators (see the Safe Address Streams for example). This general Uncertainty Function allows us to use very simple designs to achieve an almost unlimited number of random streams from the same design implementation.

One-to-One (Domain-to-Range) Model

A traditional function conforms to a one-to-one mapping of domain values and range values. The domain is the independent variable (input value) while the range is the dependent variable (output value). If the domain and range values trade places, you then acquire the inverse of the original function.

Many-to-One (Domain-to-Range) Model

A hash function maps some kind of data into a relatively small integer. The hash function's process reduces the domain data so that more than one block of data can map into the same range value. This data loss means that you cannot create a single inverse of a hash function. While the hash function model cannot be inverted, its inherent loss of information means that it is not a one-way function.

One-to-Many (Domain-to-Range) Model

A One-Way Function must support a One-to-many (domain-to-range) function model. Upon closer inspection of the Uncertainty Function, we find that the domain is any valid memory address within the data pool(s) while the range is any value stored in a memory cell. This means that each domain value (memory address) can contain all possible range values. For the first time, we have a function where the range value is completely non-deterministic for any given domain value, thus proving that the Uncertainty Function is a one-way function.

In addition, the Uncertainty Function also allows us a very simple means to create cryptographic primitives, which comprise:

Pseudorandom number generators;
Pseudorandom function families;
Bit commitment schemes;
Private-key encryption schemes secure against adaptive chosen-ciphertext attack;
Message authentication codes;
Digital signature schemes (secure against adaptive chosen-message attack).

The Uncertainty Function has value far beyond manifesting a true one-way function. Using a memory cell to hold a range value implies other possibilities besides a constant scalar value. Instead of a scalar value within the memory cell, let us assume an object pointer. The invocation of an object pointer would allow a dynamic function to return a different value in place of the simple static value. One example of such an object pointer would be an entirely new Uncertainty Function.

There are several terms used for random number generators that need to be addressed the first being Pseudo-Random Number Generator (PRNG). A PRNG uses classic random value generators to generate streams of "random" numbers, but since they use static functions and a fixed seed value they can be inverted. The current form of these types of random generators use the term "number". In the following description the term Uncertainty Random Value Generator (URVG) is used in reference to the invention. The term "value" is used throughout this description but is identical to using the term "number" as in a Uncertainty Random Number Generator URNG.

Figure 2:
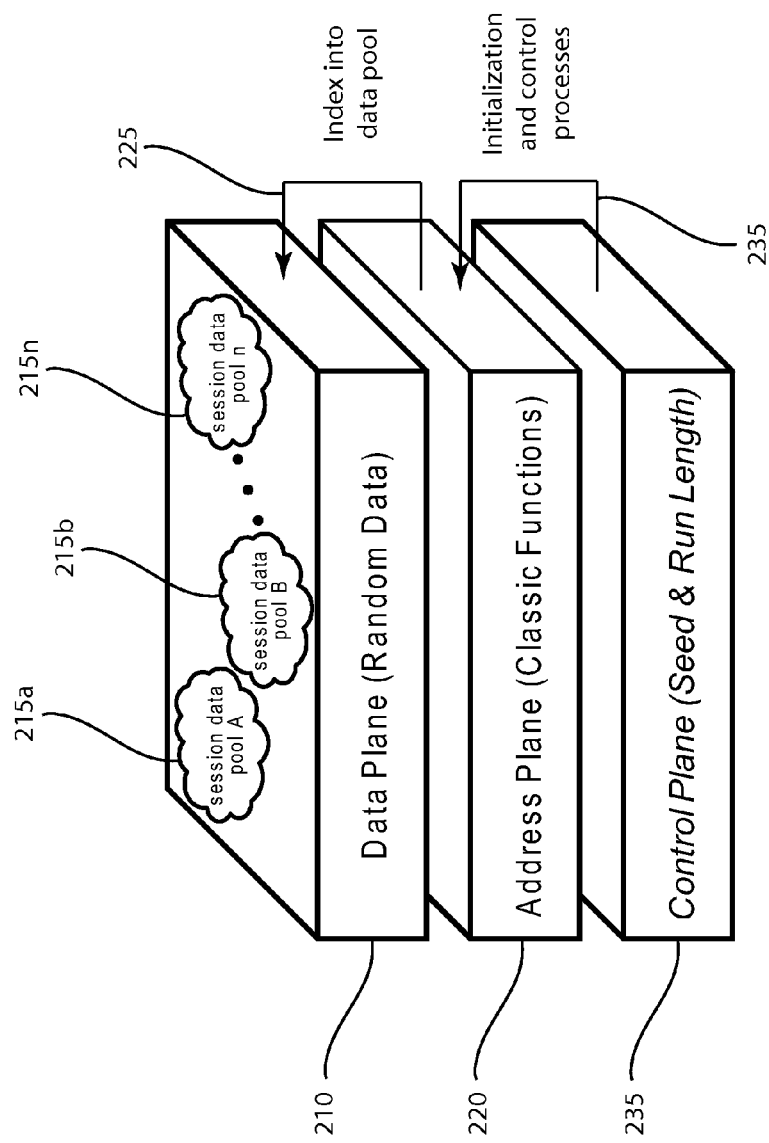
FIG. 2 is a perspective block diagram depicting three random planes of an Uncertainty Random Value Generator and the interrelationships there between according to one embodiment of the invention.

As stated earlier, classic random functions are only a one-dimensional answer to a multi-dimensional problem. The introduction of the Uncertainty Function means we now have a simple way to support multiple innovation opportunities: data, address, and control planes of randomness. Each plane of randomness can evolve without affecting the other planes. FIG. 2 is a perspective block diagram depicting the three random planes of an Uncertainty Random Value Generator and the interrelationships there between according to one embodiment of the invention.

Data Plane of Randomness

The data plane 210, referred to as the uncertainty function, is made up of one or more input data pool(s)—the session data pools 215. The data may remain static for each random value generator run or dynamically evolve (full dynamic mutation), depending on application requirements. The memory cells of the data pool(s) contain the range values.

The independence of memory contents vs. memory addressing clearly demarcates the data plane from the address plane. This means one can change the contents of memory without impacting the addressing within the design. The impact of this innovation is dramatic—given the same hardware/software implementation, each use of the URNG can be rendered unique by using a different pool of uncertainty.

Address Plane of Randomness

The address plane 220 of randomness, also referred to as random edit processes, is the means of creating data pool memory addresses (domain values). Overall, the goal of the address plane is to index 225 into the data plane 210 without repeating the output random sequence within one session run. This requires that the random address cycle length may grow with the targeted volume of random data.

Control Plane of Randomness

The control plane 235 of randomness, also referred to as a random edit processes, contains the initialization and dynamic control processes 235 (program data). Source/Session data (pool of uncertainty) contains both range data and program data. Actually, any given data value within the session data 215 can be range data and/or program data.

Most classic random value generators use a public function to generate random values. However, if you want a private random stream, the typical use of a public function has a major disadvantage. To construct a private function requires a number of public functions be combined (in secret) in some manner. In addition the user must hide or keep secret the seed value of the public function in order to create and maintain a private random stream.

The standard PRNG has a simple scalar seed value. By its very nature, the URNG requires a more complex seed specification. Starting a URNG requires the selection of two or three values, which PRNG to start, that PRNG's seed value, and optionally, a run length for that PRNG. This multiple value set is called the seed vector.

The seed vectors can be given directly or indirectly. Each vector type has different properties. The direct seed vector is a simple set of values. The advantage of the direct seed vector is that a vast number of unique random streams can be created from the same URNG. However, the disadvantage is that this vector must be protected like any standard PRNG seed value, because it reveals a great deal of information about the URNG and the unique stream it produces.

An indirect seed vector is found in the pool of uncertainty. A simple scalar indirect value is just an offset into the pool. The advantage of this indirect value is that it does not require any protection, and can therefore be sent in "the clear". The disadvantage of indirect seed vectors is that the pool of uncertainty can only hold a limited number of them. An implicit indirect value would point to a well-known place within the pool.

In some applications, a dynamic seed vector may be very useful. A normal seed vector is updated to a dynamic seed vector with some time based function and/or transaction count. The updated vector creates a unique random stream as a function of time. This dynamic seed vector works well with both static and dynamic session data. Using indirect dynamic seed vectors is a valid workaround to the limited space within the pool of uncertainty. Obviously, a dynamic seed vector enhances uncertainty.

Some applications require multiple random streams. The use of multiple seed vectors enables leveraging of the same pool of uncertainty. The way in, which these vectors are specified, is application-dependent. However, one way is to specify one vector and define a standard means to create multiple "one-off" vectors from it.

The unique data within the uncertainty function creates a private function to generate random values. This means that you can use a public seed value to create a private random stream. Fortunately, this process can be taken one step further; the public seed value could be a data pool(s) memory address (indirect public seed value). Under this method, those who hold the unique session data 215 are the only ones who know the true value of the public key.

Within the uncertainty random value generator you are likely to have different classic random value generators as part of your implementation. In some cases, only a few classic functions will be used during the entire session run, while in other cases, there will be a dynamic switching between different classic functions of different run lengths. The control process of picking which classic function, seed value, and run lengths can be dynamically assigned via unique programmatic data. Note that each initialization parameter comes from the pool of uncertainty—this means that the dynamic dependence on uncertain data helps to remove deterministic behavior from the URNG. The uncertainty random value generator provides us with a multi-dimensional answer to a multi-dimensional problem.

Figure 3:
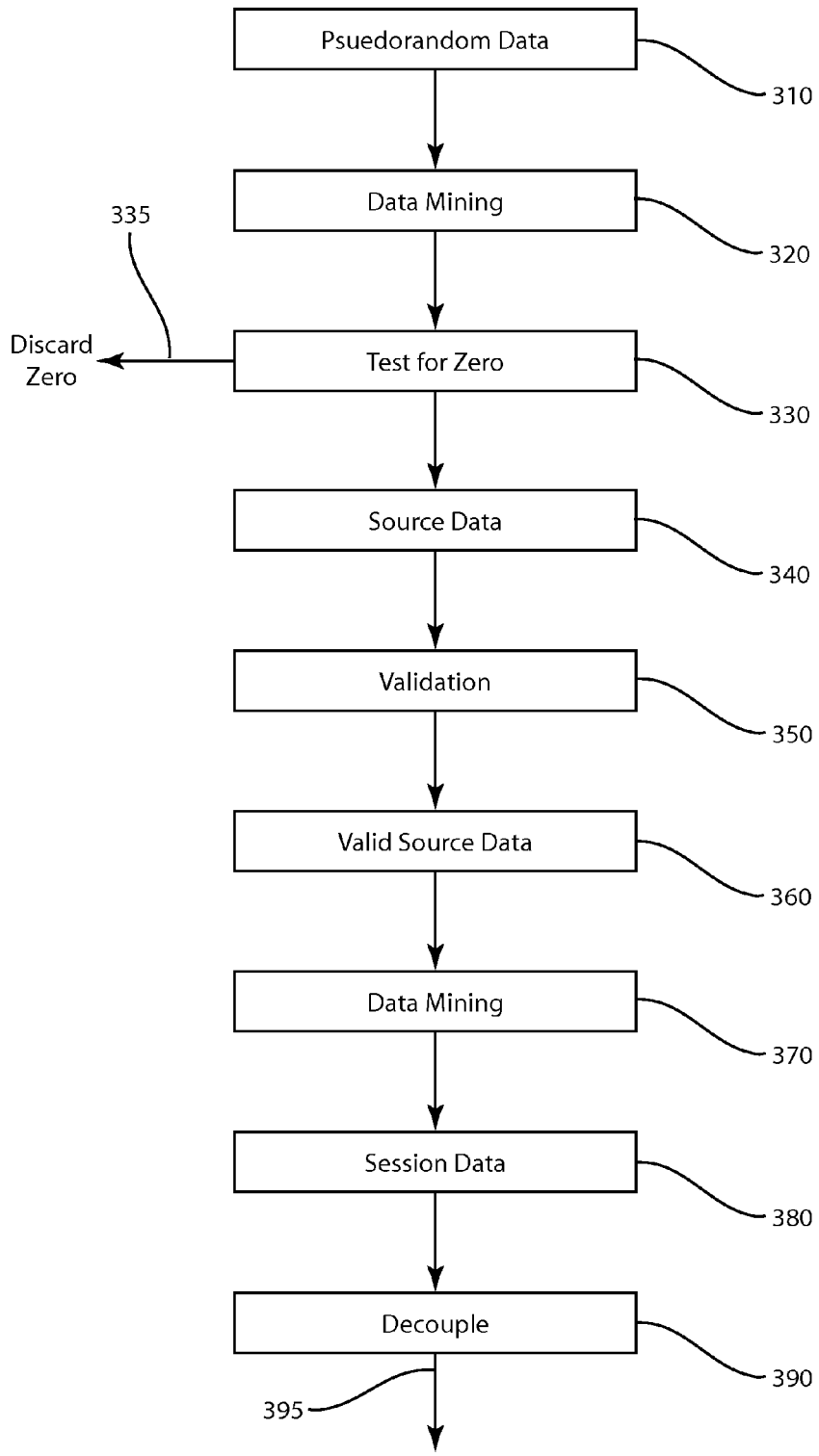
FIG. 3 is flowchart showing an overview of a process of generating a random data stream using an abstraction approach according to one embodiment of the invention.

FIG. 3 is a flowchart showing an overview of a process of generating a random data stream using the abstraction approach according to one embodiment of the invention. Any source of random data may be used in the creation of source data. These sources may comprise unpredictable random numbers determined by measuring physical phenomena such as radioactive decay, thermal noise in semiconductors, sound samples taken in a noisy environment, and even digitized images of a lava lamp.

Other more easily attained candidates for pseudorandom data are compressed files comprised of MPEG, JPEG, and other compressed files. Pseudorandom data 310 is abundant in most computer memory hierarchy as compressed data files and can be used as a source for creating a random data pool. A data mining process 320 randomly pulls values from the pseudorandom data 310 and randomly writes them into a source data 340 file. All values are tested for a zero value 330, data with a zero value are discarded 335. Before using the source data 340 to create random value streams it must first be validated 350. After the validation process 500 the valid source data 360 can be used to create random data stream 395. Once there is valid source data 360 data mining 370 the valid source data 360 creates session data 380. This session data 380 is still not completely hidden from hackers and a process of decoupling 390 must be performed.

During the Decoupling process 390 relationships between the session data 380 and the resulting random value stream 395 are destroyed. There are two types of session data 380, a dynamic session data pool and a static session data pool. A dynamic session data pool is used once and then discarded. Applications of dynamic session data pool comprise phone calls, internet transactions, credit card transactions, any type of communication between two or more parties. Examples of the use of static session data pool include but are not limited to encryption of data in a media player device and Digital Rights Management (DRM) applications. Static random data pools are stored and used to encrypt and decrypt data.

Creating Source Data

Good random data should have roughly an equal number of zeros and ones in the binary data when all the data is tested. At the binary level, a preponderance of zeros or ones is not considered the balanced data we seek. Keep in mind; our overall goal in this process is session data with an unknown creation "melody". So long as you keep the overall goal in mind, the places to find random data are vast. One such place is compressed data as earlier stated. These files have an equal probability of zeros and ones in the binary data. Of course, this is not counting the file structure information found in compressed files.

While stepping over the file structure, the process of data mining compressed files effectively creates source data. Despite the many ways one can data mine, one method is to open multiple compressed files and randomly sample between the open files until completing the creation of a source data. For best results, one byte at a time should be the sampling size. The source data is defined as the file that contains all of the possible data to be utilized by the uncertainty random value generator.

In order to mine only the compressed data, the mining software must know the file format. In other words, care must be taken to not pick up file structure information as data, only data within the compressed file. The data-mining process to create the source data 340 will prevent placement of any zero values into the file. Any zero value is invalid in the majority of hardware and software functions. No zero value should be placed in the source data 340.

Figure 4:
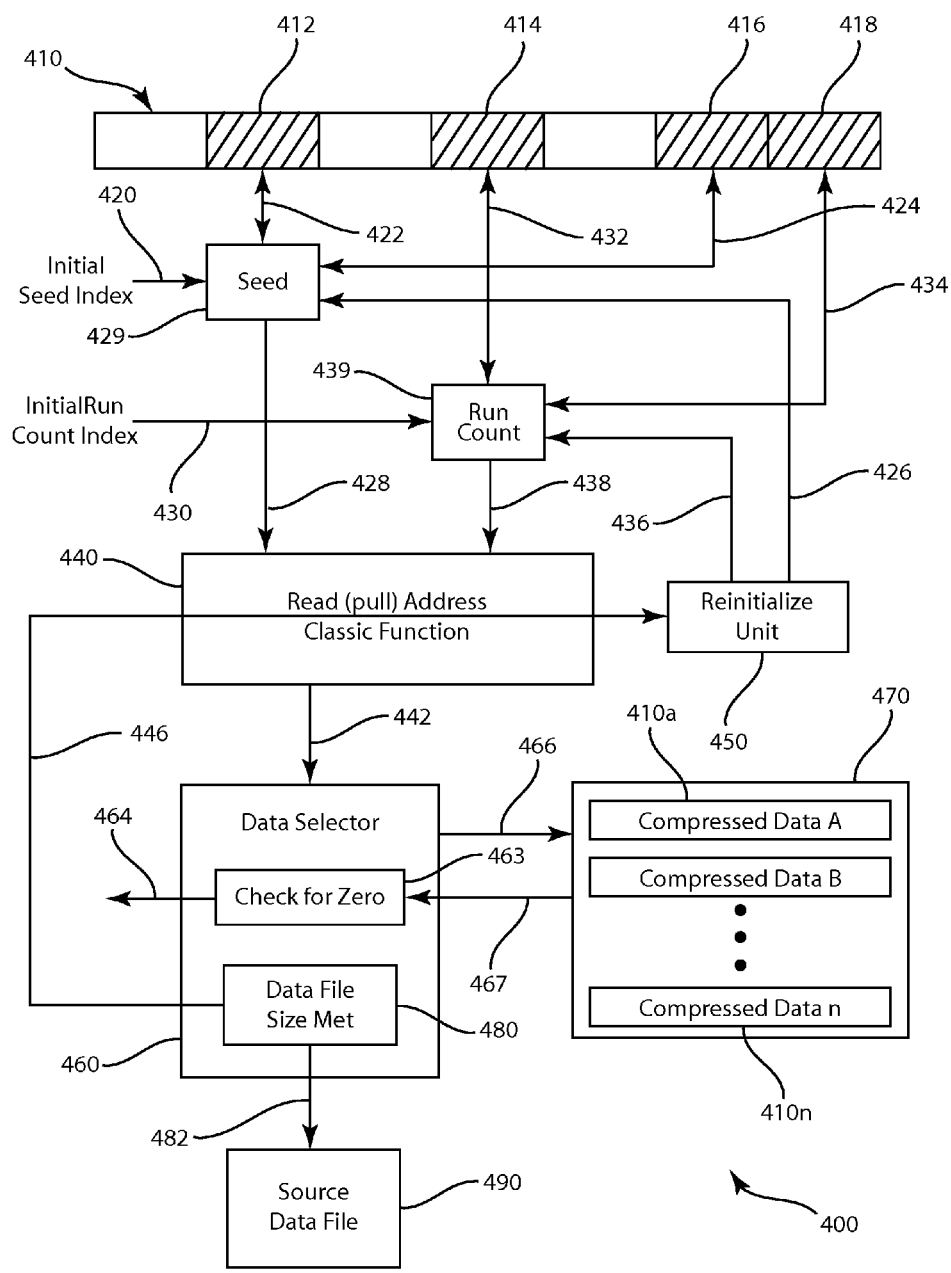
FIG. 4 is a block diagram depicting an embodiment of a data mining module/process in which values are pulled from compressed data, checked for a zero value which is discarded, and written into a source data file according to one embodiment of the invention.

FIG. 4 is a block diagram depicting an embodiment of a data mining module/process 400 in which values are pulled from the compressed data 410, checked for a zero value 463 which is discarded 464 then written 482 into a source data file 490 according to one embodiment of the invention. Creation of source data 490 revolves around the address read (pull) classic function 440. Inputs comprise control signals, seed value 428, run length count value 438. An initial seed index 420 is used to pull memory contents 412 which becomes the current seed value 428. An initial run length count index 430 is used to pull memory contents 414 which becomes the current run length count value 438. The current classic function 440 then starts producing an address index stream 442 that is used to pull 466 values from one of a plurality of compressed data files 470. If more than one compressed data file is used then the source data selector 460 connects to the appropriate compressed data file 410a through 410n in the pool of compressed data 470. There are many ways to determine this connection including but not limited to consecutively cycling through the compressed data files, or randomly connecting to different compressed data files 470. The current read (pull) address index 442 is used to pull the value from the selected compressed data file 410. Each value 467 pulled from the compressed data file 410 is checked to determine if the value equals zero 463 and any zero value 464 is discarded. Source data is written into the source file 490 in sequential order. Data file size met unit 480 determines when the source file 490 is full or needs more data and feeds a signal 446 back to the address read (pull) classic function 440.

An option to this process is to dynamically change the classic functions for the read (pull) address classic function 440. Another method for dynamic change involves changing the seed index 428 and run length count index 438 throughout the data mining process 400. The reinitialize unit 450 may receive a command from the data file size met unit 480. The reinitialize unit 450 transmits a seed value reinitialize value 426 to the seed unit 429 and run length count reinitialize value 436 to the run length count unit 439.

After construction of the source data 490, the validation process 350 begins. A variety of good statistical test suites are available to validate random data. The National Institute of Standards and Technology, NIST, produces one such package (NIST Special Publication SP800-22). Failure of any validation process 350 is sufficient to invalidate this source data 490, in which case another will have to be created. Validation tests comprise:

NIST Test Suite
Maurer's Universal Statistics
Lempel-Ziv Complexity
Approximate Entropy Completing this validation process 350 validates the source data 490. Though the validation process 350 disqualifies a number of dysfunctional data sets, it also confirms that a virtually unlimited number of valid source data 490 function properly. The size of the valid source data 490 is not fixed. The only requirement entails that it be large enough to make good random streams.

Creating Session Data

Over time, consistently using the same data in the uncertainty random value generator will create a problem. By the repetitious use of the same data pool, a cracker may determine which data set being used. While there are many ways to accomplish refreshing the stale data in the data pool, a new step is proposed. The valid source data 360 is mined 370 to create new session data for each use of the uncertainty random value generator. The name session data 380 accurately describes the data because it is used only once (or at most a few times) and then discarded. Also, the session data 380 may be validated 350 in the same manner as the valid source data 360. In this way, the data in the uncertainty random value generator remains fresh and therefore unbreakable.

The session data 380 is a proper subset of the source data 360 to be used for each run of the uncertainty random value generator. No implied dependency exists between the size of the valid source data 360 and the session data 380. For example, one might assume that the source data 360 is larger than the session data 380 requirement. However, that is not an absolute. If one has a smaller source data 360 than the required session data 380, the mining process 370 continues until the session data 380 requirement is satisfied. Thus, the source data 360 may be smaller or larger than the session data 380. The hardware or software may support different sized session data 380 sets. Session data 380 set size will most likely change with the target application. However, if you want a private random stream, the typical use of a public function has a major disadvantage. To construct a private function requires a number of public functions be combined (in secret) in some manner. In addition the user must hide or keep secret the seed value of the public function in order to create and maintain a private random stream. Once you have good data with an unknown creation "melody", you are ready to proceed.

Each unique hardware or software uncertainty random value generator design will interact with unique session data 380 in different ways. It is possible to have "validated" session data 380 that fails to produce "validated" output data from a given uncertainty random value generator design. Therefore, to minimize this problem, one must carefully tune both random edit processes (see random edit processes below) and the session data 380. Of all the possible source/session data sets that could be created, only some will function correctly.

Random Edit Modules/Processes

As noted above, a classic, one-dimensional random value generator cannot solve a multi-dimensional problem. Instead, this problem necessitates a solution that establishes uncertain randomness. This is accomplished by a simple concept, which lays the foundation for an open-ended set of solutions; several examples are provided. The application of one or more random edit modules/processes attains uncertain randomness by destroying any lower order "melody". The Random Edit Module/Process is used to incorporate additional randomness into a set of one or more random input streams. The blending together of multiple random streams tends to removes some/most/all of the "melody" of the input streams. The random edit process requires one or more random streams, one of which is defined as the "edit stream". Edit stream data is only used to alter bits or the order of values from the other input streams, and is otherwise never visible in the output stream. Actually, the edit process mutates the already random input stream(s) into a new random output stream.

Figure 5:
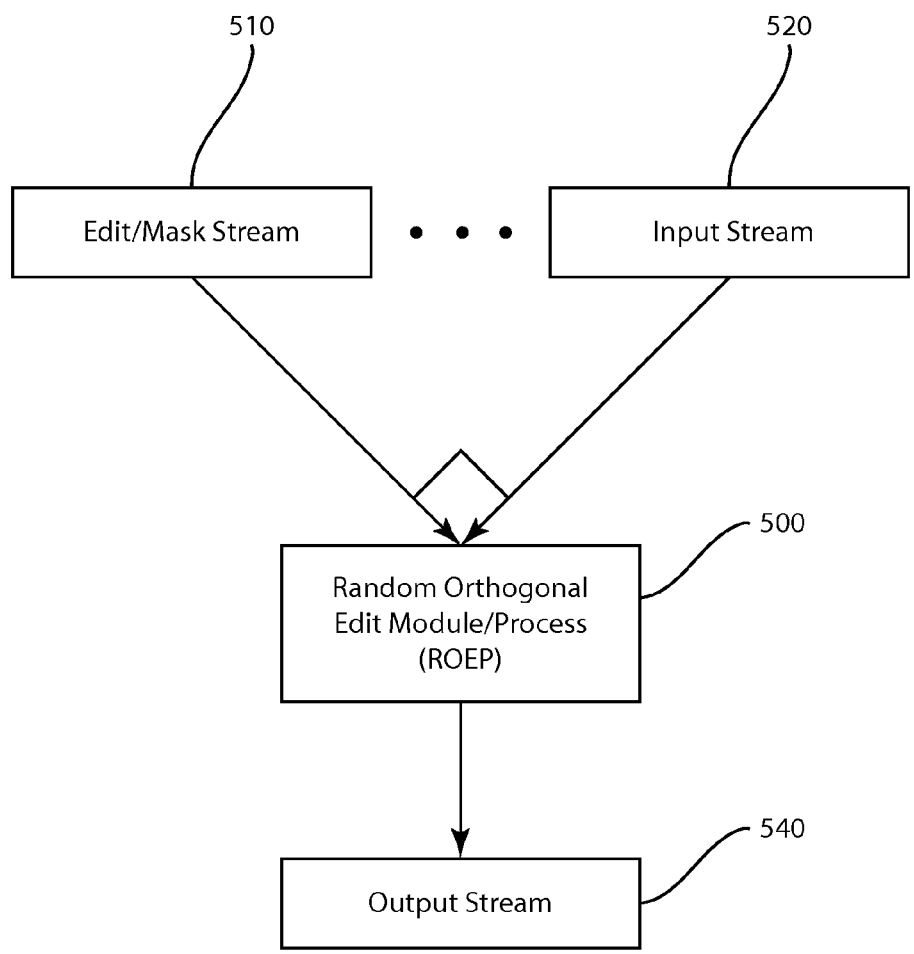
FIG. 5 is a block diagram of a system depicting a random edit process for generating a random output stream according to one embodiment of the invention.

FIG. 5 is a block diagram of a system depicting a random edit process for generating a random output stream 540 according to one embodiment of the invention. At least one of the input streams must be an edit stream 510. The Random Edit Module/Process 500 alters one or more input data streams 520 whose edit stream 510 data remains isolated from the output stream 540. The term edit describes the action taken on the input data stream(s). The edit process 500 mutates the already random input stream(s) 520 into a new random output stream 540.

Figure 6:
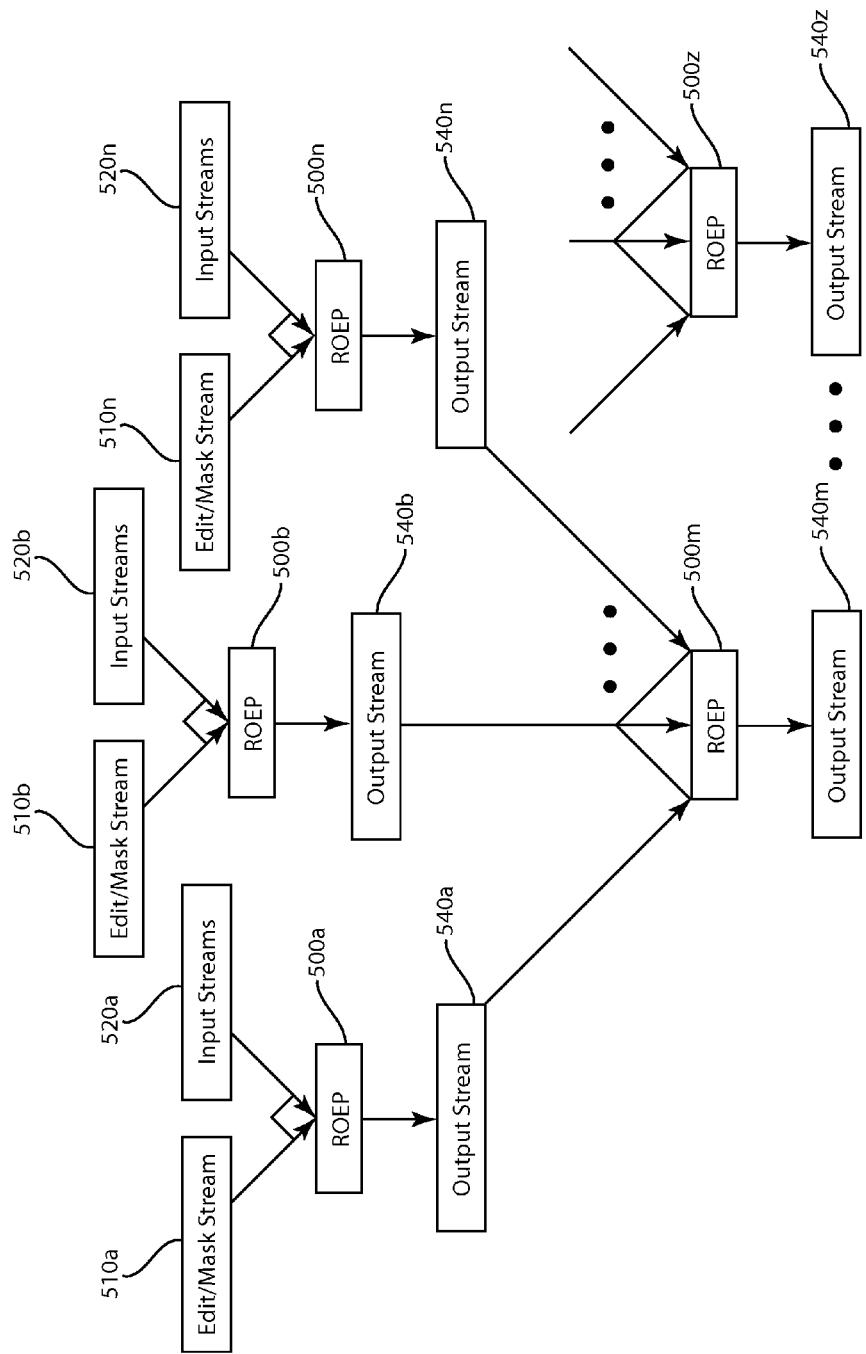
FIG. 6 is a block diagram of a system implementing multiple random edit processes for generating a random output stream according to one embodiment of the invention.

FIG. 6 is a block diagram of a system implementing multiple random edit processes for generating a random output stream according to one embodiment of the invention. Several Random Edit Processes 500a through 500n provide input streams 540a through 540n to another Random Edit Process 500m. One of the input streams must be an edit stream. Multiple levels of Random Edit Module/Processes 500 allow the user to design a system as simple or complex as needed. Common interfaces combined with the abstract approach result in an architecture that is easily expanded.

In the simplest of terms, the Random Edit Module/Process 500 adds additional randomness. The edit process alters these input streams dynamically with a random edit process, resulting in additional randomness. The overall result is a new random output stream that no longer contains the "melody" of any input stream. Since no data ever comes from the edit stream, there is no "forensic evidence" to identify the edit stream. In other words, the output stream has lost the "memory" of the melodies in the input streams.

The first use of the Random Edit Module/Process 500 is to randomly address into the data pool to pull out data. Not leaving any edit forensic evidence behind, the original "melody" (copy of session data) is lost (not visible), as a new random stream is produced. The original random stream (session data) has been mutated into a unique stream of randomness. Each of these planes of randomness can evolve separately without influencing the other.

Using linear addresses to pull data from the data pool will produce a random stream up to the data pool size. While this works for very small random data requirements, it does expose the data pool contents. Linear addressing should never be used to access the data pools. Any of the functions, features, benefits, structures, and etc. described herein may be embodied in one or more modules also referred to as processes.

The Mask Generator

Figure 7:
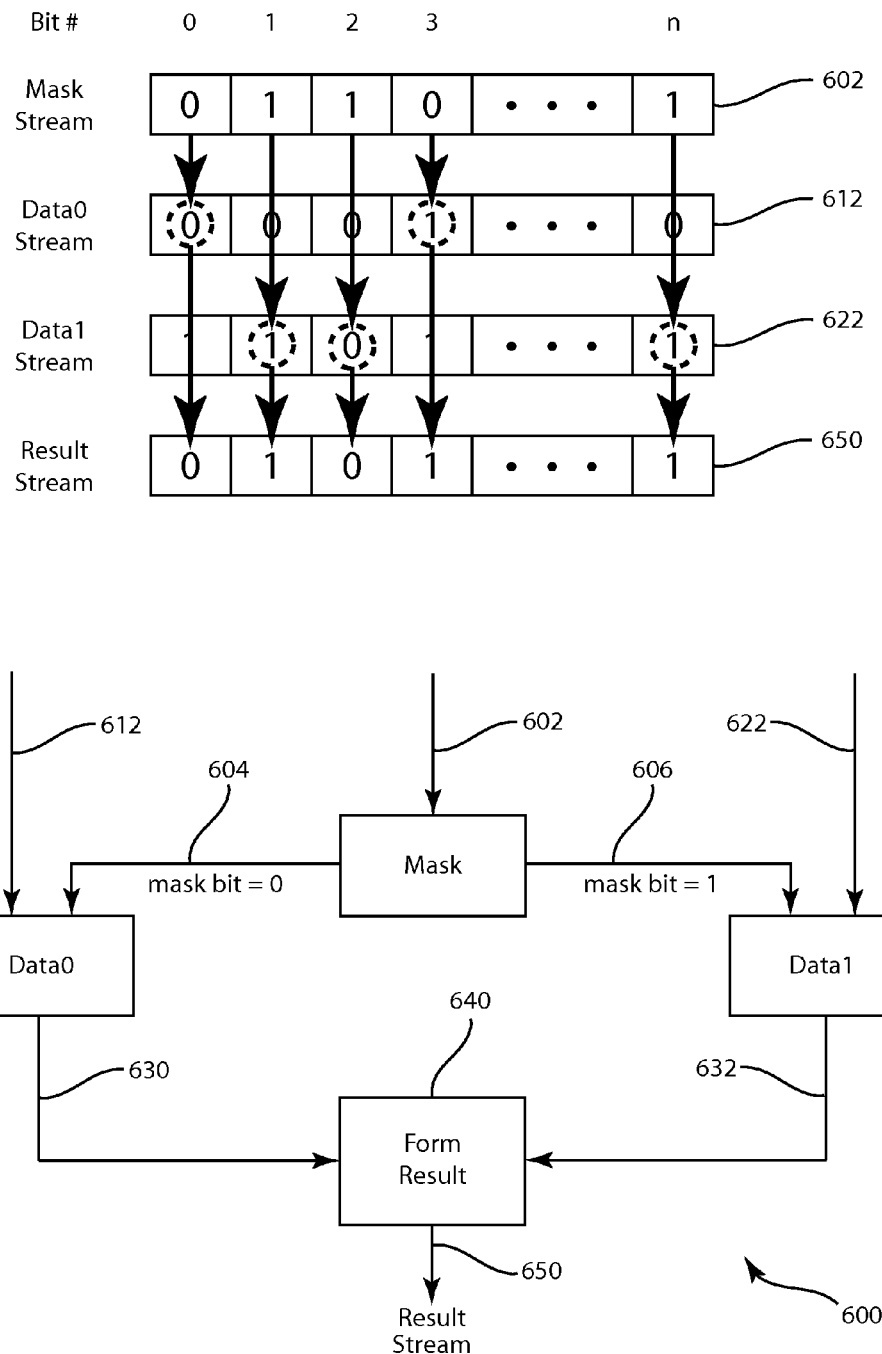
FIG. 7 illustrates bit manipulation during a Mask Generator Process according to one embodiment of the invention.

Here is another example of a Random Edit Process at work. FIG. 7 illustrates bit manipulation during a Mask Generator process 600 according to one embodiment of the invention showing a bit by bit process to form 640 a result stream 650. Three random streams called data0 612, data1 622, and the mask stream 602 are input streams to the mask generator. One stream is used for editing and is referred to as the Mask stream 602. The other two streams, data0 612 and data1 622 are edited by the mask stream 602 to form the result stream 650. Each mask bit "0" 604 selects the corresponding data0 bit 630 from data0 stream 612. Each mask bit "1" 606 selects the corresponding data1 bit 632 from data1 622. As each result bit is determined it is sequentially added to the result stream 650. The following C programming language code demonstrates the Mask Generator process:

```
// Stage 1, mask generator
Mask = mask_Stream( ); // get Random Edit Process value
data0 = Stream0( ); // get random data0 value
data1 = Stream1( ); // get random data1 value
```

```
Result = (~Mask & data0) | (Mask & data1);    // use the edit value to
    randomly mix bits from data0 & data1
```

The mask stream 602 is only utilized to destructively "edit" the data from the two different input values, so the mask value is never visible in the output. By randomly taking some of the bits from data0 stream 612 and the remaining bits from data1 stream 622, without adding any mask bits to the output, the edit process is unknown (invisible) with respect to the inputs or the output. The next three values from these three streams will produce yet another unknown value.

The Mask Generator 600 excels as a simple way to decouple the "melody" of the input streams. As these three random streams interact, they produce a second-order "melody", while all traces of the first order melodies are lost. Dismantling the first order melodies only partially solves the overall "melody" issue. The second-order "melody" must also be disassembled. While a single, random edit process does not represent a complete solution, it does teach us how to destroy the first order melodies. Viewing the Mask Generator at the bit level illustrates the results of the random edit process.

Longer Cycle Periods

There is another benefit of the Random Edit Process—a much longer cycle period. The longer cycle length is based on the simple idea, when using differentiated cycle lengths on input streams, each input stream will not synchronize with the others, until the product of each cycle length has been reached. If one starts with differentiated cycle lengths for the input streams, then the Random Edit Process facilitates very long cycle periods. Start with three random classic functions each with a different cycle period and label these different period lengths as P1, P2, and P3. The mask generator has an overall period of P1*P2*P3, this product is labeled as S1. This single stage Mask Generator is made up of three input streams, and has a very long cycle period compared to the input stream periods.

However, some applications require even longer cycle periods. This can be constructed with three single stage Mask Generators having differentiated cycle lengths of S1, S2, and S3. Using these Mask Generators as inputs to another Mask Generator constitutes a $2^{nd}$ stage Mask Generator. It has an overall cycle period of S1*S2*S3, a truly large number. Thus, the pattern of stacking mask generators, or any other Random Edit Processes, to create any arbitrary period is defined.

As a general rule of thumb, each additional Random Edit Process of a differentiated cycle length adds another term to be multiplied in order to compute the overall cycle period of the generator. The following C programming language code is an example of $2^{nd}$ stage Mask Generator.

```
// First group of three Streams => Stage 1, mask random generator
Mask = mask_Stream0( );      // get random Edit value
data0 = Stream0( );          // get random data0 value
data1 = Stream1( );          // get random data1 value
Result1 = (~Mask & data0) | (Mask & data1); // use edit value to mix
    bits from data0 & data1
// Second group of three Streams => Stage 1, mask random generator
Mask = mask_Stream1( );      // get random Edit value
data0 = Stream2( );          // get random data0 value
data1 = Stream3( );          // get random data1 value
Result2 = (~Mask & data0) | (Mask & data1); // use edit value to mix bits
    from data0 & data1
// Third group of three Streams => Stage 1, mask random generator
Mask = mask_Stream2( );      // get random Edit value
data0 = Stream4( );          // get random data0 value
data1 = Stream5( );          // get random data1 value
Result3 = (~Mask & data0) | (Mask & data1); // use edit value to mix
    bits from data0 & data1
// Stage 2, mask random generator
Mask = Result1;              // get random Edit value
data0 = Result2;             // get random data0 value
data1 = Result3;             // get random data1 value
Result4 = (~Mask & data0) | (Mask & data1); // use edit value to mix bits
    from data0 & data1
```

Here are some real numbers behind this feature. Utilizing the simplest software random value generator (Linear Congruential) with nearly maximum periods, the overall period for a stage 1 Mask Generator would be roughly $2^{95}$. For the $2^{nd}$ stage Mask Generator, the cycle period would be about $2^{288}$, while a $3^{rd}$ stage Mask Generator would be on the order of $2^{850}$. These values assume common 32-bit math. For 64-bit math, stage 1 is about $2^{191}$, stage 2 would be about $2^{575}$, while a Stage 3 would be about $2^{1725}$. This is a very low cost means to produce arbitrarily long cycle periods.

How much does the stacking of Mask Generators cost in software? A simple Linear Congruential Generator is constructed with one multiplication, one addition and one modulus (division) operation. The total cost is three math operations with a few memory loads and stores. A Stage 1 Mask Generator is three times that cost plus four bit-wise logical operations. For less than 50 instructions, results in a good, very long cycle, random value generator. A stage 2 Mask Generator costs less than 150 instructions. Finally, you only need to select the target cycle length and, depending on the processor, select possible math (16, 32, or 64 bit) as well. Equally low-cost solutions can be found in hardware. By utilizing classic, published Linear Feedback Shift Registers, we can construct very good bit generators with correspondingly long cycle periods.

Mask generators are a major improvement over classic functions. They are fast and inexpensive to use. They have a very simple means to support arbitrary cycle periods. Most importantly, they are harder to crack than classic random functions when uncertain data is used as the mask value.

The Mask Generator is the second example of an open-ended class of such Random Edit Processes. Additional representative examples are listed below that may be used in any of the preferred embodiments. These edit processes are used to instruct any person trained in the normal software and/or hardware design tools to construct additional edit processes without stepping outside the preferred embodiments.

While each additional Random Edit Processes has the same effect on the overall cycle length, some preferred embodiments will only use a few while others use many times that, depending on application requirements.

Additional Random Edit Processes

Also, Each Random Edit Process can be viewed as an instruction that mutates random input streams. These instructions can range from simple to very complex. While some of these instructions offer little additional value, the larger set is listed for teaching purposes. The instruction is the Random Edit Process while the mask value represents additional data to the instruction for optional use.

Each edit process will be described in the simplest means possible. For many cases, this will be the C programming language, while other times this will be portrayed with graphics. Keep in mind anyone skilled in the art in hardware and/or software will be taught the intended effect of the edit process. Currently, these edit processes are based on three random streams. Additional random streams could be added without affecting the overall theory of random edit processes. The following code demonstrates edit processes:

Pass Through Random Edit Process (NOP)

```
NOP (No Operation)
    Result    = data;        // just return a data element
```

Basic Bitwise Logical Operations

```
NOT (Bitwise Not Operation)
    Result = ~data;          // complement data element and return it
Bitwise OR
    Result = data0 | data1;  // bitwise OR between two data elements
Bitwise AND
    Result = data0 & data1;  // bitwise AND between two data elements
Bitwise XOR (Exclusive-OR)
    Result = data0 ^ data1;  // bitwise XOR between two data elements
```

Mask Generators Family of Operations

```
Normal Mask Generator (Original)
    Result = (~Mask & data0) | (Mask & data1); // use Edit Process value
        to mix bits from data0 & data1
The Other Mask Generator
    Result = (Mask & data0) | (~Mask & data1); // use Edit Process value
        to mix bits from data0 & data1
```

The Mask Generator is produced from the destructive edit between two random values. So long as the destroyed data is discarded, the mask value will remain invisible. Therefore only one form of the Mask Generator should be used for each mask value generated.

```
Complement one of the data elements and then mask
    Result = (~Mask & ~data0) | (Mask & data1);  // use Edit Process value
        to mix bits from ~data0 & data1
    Result = (~Mask & data0) | (Mask & ~data1);  // use Edit Process value
        to mix bits from data0 & ~data1
```

Reverse Operations Random Edit Processes

Like the complement operator, a reverse operation is also a unary operation that can be applied to any value such as data0, data1, or mask.

```
Reverse the bits in a data item and then return it
    // Reverse the bits of data0 (32 total).
    data0 = ((data0 & 0xAAAAAAAA) >> 1) | ((data0 &
        0x55555555) << 1);
    data0 = ((data0 & 0xCCCCCCCC) >> 2) | ((data0 &
        0x33333333) << 2);
    data0 = ((data0 & 0xF0F0F0F0) >> 4) | ((data0 &
        0x0F0F0F0F) << 4);
    data0 = ((data0 & 0xFF00FF00) >> 8) | ((data0 &
        0x00FF00FF) << 8);
    data0 = (data0 >> 16) | (data0 << 16);
    Result = data0;
Reverse the bits in a data item and then return it
    // Reverse the bits of data1 (32 total).
    data1 = ((data1 & 0xAAAAAAAA) >> 1) | ((data1 &
        0x55555555) << 1);
    data1 = ((data1 & 0xCCCCCCCC) >> 2) | ((data1 &
        0x33333333) << 2);
    data1 = ((data1 & 0xF0F0F0F0) >> 4) | ((data1 &
        0x0F0F0F0F) << 4);
    data1 = ((data1 & 0xFF00FF00) >> 8) | ((data1 &
        0x00FF00FF) << 8);
    data1 = (data1 >> 16) | (data1 << 16);
    Result = data1;
```

Now we define a reverse operation (ROP) and recreate the Mask Generator set with ROP.

```
Result = (ROP (Mask) & data0 ) | (Mask & data1);
Result = (~Mask & ROP (data0) ) | (Mask & data1);
Result = (~Mask & data0 ) | (ROP (Mask) & data1);
Result = (~Mask & data0 ) | (Mask & ROP (data1));
Result = (ROP (Mask) & data0 ) | (~Mask & data1);
Result = (Mask & ROP (data0) ) | (~Mask & data1);
Result = (Mask & data0 ) | (ROP (~Mask) & data1);
Result = (Mask & data0 ) | (~Mask & ROP (data1));
Result = (ROP (Mask) & ~data0 ) | (Mask & data1);
Result = (~Mask & ROP (data0) ) | (Mask & ~data1);
Result = (~Mask & ~data0 ) | (ROP (Mask) & data1);
Result = (~Mask & data0 ) | (Mask & ROP (~data1));
```

At this point ROP as another unary operation makes an excellent random edit process.

Rotate Random Edit Process

Use some of the bits from the mask value to select the number of bits to rotate right or left Like the complement operation, "rotate" is a unary operation that can be applied to any value, data0, data1, or mask. We define ROTL_MASK as rotate left x number of bits from the mask value. We define ROTR_MASK as rotate right "x" number of bit from the mask value.

```
Result = ROTL_MASK ( data0 );
Result = ROTL_MASK ( data1 );
Result = ROTR_MASK ( data0 );
Result = ROTR_MASK ( data1 );
Result = ROTL_MASK (~data0 );
Result = ROTL_MASK (~data1 );
Result = ROTR_MASK (~data0 );
Result = ROTR_MASK (~data1 );
```

We can even go back and use this with the Mask Generators.

```
Result = (~Mask & ROTL_MASK ( data0 ) ) | (Mask & data1);
Result = (~Mask & ROTR_MASK ( data0 ) ) | (Mask & data1);
Result = (Mask & ROTL_MASK ( data0 )) | (~Mask & data1);
Result = (Mask & ROTR_MASK ( data0 )) | (~Mask & data1);
Result = (~Mask & ~data0 ) | (Mask & ROTL_MASK ( data1));
Result = (~Mask & ~data0 ) | (Mask & ROTR_MASK ( data1));
Result = (~Mask & data0 ) | (Mask & ROTL_MASK (~data1));
Result = (~Mask & data0 ) | (Mask & ROTR_MASK (~data1));
```

Note; you can rotate and then complement, or complement and then rotate.

You can mix as many unary operations as you like per data elements data0, data1, or mask. The overall effect is a truly open-ended set of possible Random Edit Processes.

Math Operations Random Edit Processes

```
Result = data0 + data1;    // standard math add operation
Result = data0 − data1;    // standard math subtract operation
Result = data0 * data1;    // standard math multiple operation
Result = data0 / data1;    // standard math division operation
```

Constructing Random Stream Bit Density

With the aid of multiple random streams, it is possible to create a random stream of nearly arbitrary bit density, either ones or zeros. Let us start with two simple assumptions:

Each random stream is orthogonal relative to all the other random streams

Each random stream has equal probability at the binary level (zero or one)

With these two assumptions we can construct a wide range of random streams with different bit densities as shown in Table 1.

TABLE 1

| Number of Streams | Logical OR between the Streams | Logical AND between the Streams |
|---|---|---|
| 1 | 0.50000 | 0.50000 |
| 2 | 0.75000 | 0.25000 |
| 3 | 0.87500 | 0.12500 |
| 4 | 0.93750 | 0.06250 |
| 5 | 0.96875 | 0.03125 |
| 6 | 0.98438 | 0.01563 |
| 7 | 0.99219 | 0.00781 |
| 8 | 0.99609 | 0.00391 |

When you do a "logical bit wise or" between two random streams you get a probability 0.75 of a one bit. When you do a "logical bit wise and" between two random streams you get a probability 0.25 of a one bit. The above table 1 is what happens when you process more random streams together.

By mixing multiple streams together with "logical or" as well as "logical and" you can achieve a wide range of selected random bit densities. For example 0.75*0.00391 giving 0.0029325 probability of a binary one in the random stream. This process of creating selected bit densities for a random stream is defined as an unbalanced random stream.

Using an unbalanced random stream as the mask stream allows you to manage how aggressively you edit the input random data streams in a random edit process.

Chunks, Chunker, and Chunking

There are common names for fixed size groups of bits known as nibbles, bytes, words, etc. For this discussion the term "chunk" is defined as zero or more contiguous bits. Clearly a size of zero bits is an empty chunk.

Earlier we defined a random stream as any member of the above abstracted class implemented by any combinations of classic and/or uncertainty random value generators. We now define a data stream as any input data stream (random or not). The idea of dicing a data stream into variable sized grouping of bits known as chunks is used to visualize contiguous bits without fixed boundaries or sizes.

The process of cutting up a data stream into chunks is called chunking and the tool that does this becomes a Chunker. Chunks are taken from a continuous data stream in one of two modes: 1) sampling mode which samples (chunks) a target stream; or 2) consumption mode which chunks a chunk stream.

Consumption Mode—a Target Stream Chunker dices all the data in the target stream, one chunk at a time.

Sampling Mode—a Chunk Stream Chunker takes a subset of the chunk stream chunk by chunk until the result stream is complete and the remainder of the data is discarded.

As noted above, the Chunker can sample or consume the data stream. The reason that the term "chunk" is required as the Chunker is told what size chunk it should produce. The chunk size will often change between uses of the Chunker.

A Consumption Chunker dices the entire target stream into variable size chunks. As chunks are removed, no target stream bits are lost in this process. The input variable to a Consumption Chunker is chunk size.

Figure 8:
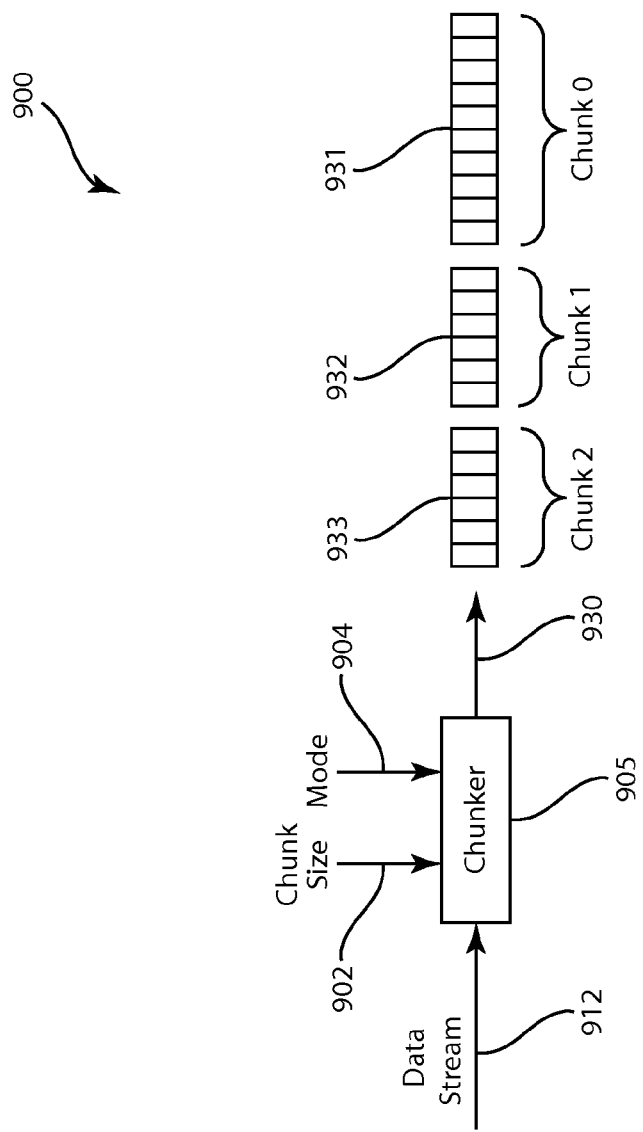
FIG. 8 is a system flow diagram depicting a chunking process in which a data stream is chunked into variable size chunks according to one embodiment of the invention.
Figure 9:
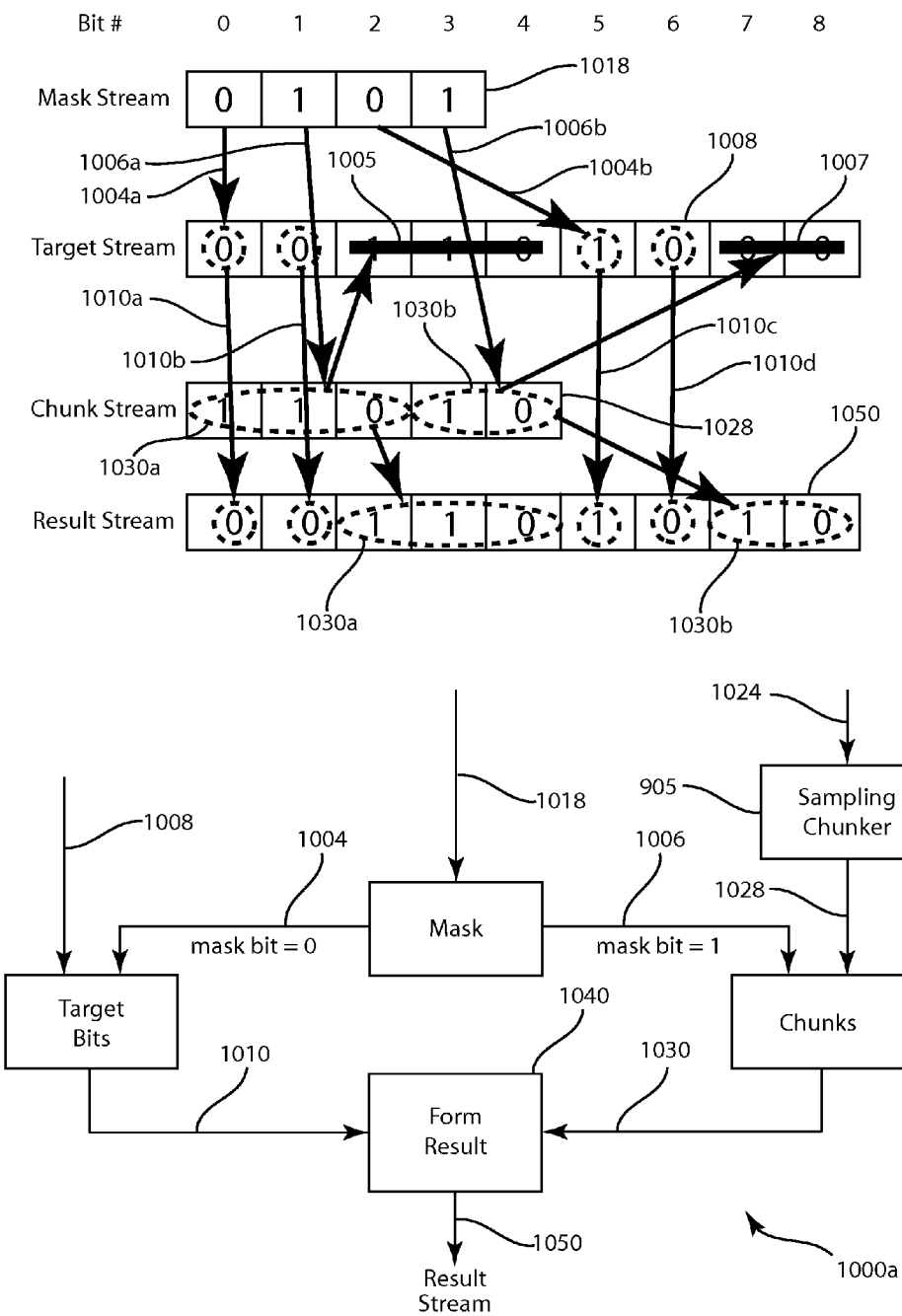
FIG. 9 illustrates bit manipulation during a Replace random edit process wherein the data chunks replace an equal amount of target stream bits.

FIG. 8 is a system flow diagram depicting the chunking process 900 in which a data stream 912 is chunked into variable size chunks according to one embodiment of the invention. The chunker 905 receives data from the input data stream 912 and the chunker 905 chunks the data from the input data stream 912 into variable size chunks 931, 932 and 933. Control signals, chunk size 902 and the mode of operation 904, provide instructs to the chunker 905. The chunker output 930 is a series of chunks depicted as chunk0 931, chunk1 932, and chunk2 933. Although variable size chunks are depicted in FIG. 9 the chunks may all be the same size.

Hardware and software are optimized for fixed size units like bytes, words, and sometimes bits. A Sampling Chunker samples data stream 912 and produces variable size chunks while discarding any unused portion. There are two input values, chunk size 902 and unit size 904. The chunking process 900 is used in the Replace and Expand random edit processes.

"Replace" Random Edit Process

The Replace random edit process is a destructive process that edits a target stream without expanding the size of the result stream. As each chunk is inserted, the corresponding target stream bits are replaced. The key effect is to not change the size of the target stream.

FIG. 9 illustrates bit manipulation during an Replace random edit process 1000a wherein the chunk stream 1028 chunks replace an equal amount of target stream 1008 bits. As in the Mask process the Replace process starts with at least three input random streams: 1) the mask stream 1018, 2) a target stream 1008, and 3) a chunk stream 1028. The mask stream 1018 is used to edit the target stream 1008. Each mask bit "0" 1004 selects the corresponding target bit value 1010 from target stream 1008. A mask bit "1" 1006 bit in the mask stream 1018 instructs the replace process to take the appropriate chunk 1030 from the chunked stream 1028 and replaces the appropriate target stream bits to the right/left of the insertion point.

The upper portion of FIG. 9 shows the chunk stream 1028 with the first two chunks, chunk 1030a and chunk 1030b, identified. In this embodiment the chunker 905 is set to sampling mode. The first mask stream 1018 mask bit 1 1006a instructs the replace process to take chunk 1030a and replace the target stream 1008 bits to the right/left of the insertion point indicated by mask bit 1010a. The target stream 1008 and the result stream 1050 show the relationship of the chunk stream 1028 chunks 1030*a* and 1030*b* to the remaining target stream bits 1008. There are five input parameters: target stream 1008, chunk stream 1028, mask stream 1018, insert right (or left), and chunk size.

Clearly, a chunk size or mask value of zero means you simply return target bit so that the operation becomes a NOP. It is assumed word size is the upper bound for target stream 1008, chunk stream 1028, mask stream 1018, chunk size, and the result stream 1050.

The replace process 1000*a* can either take place to the left or right of the insertion point. Each "1" bit in the mask stream 1018 represents a possible replace point—if mask size or chunk size equals zero then there is no replace. As chunk size increases, only the leading replace point(s) are used before filling the result value. The result stream 1050 is built up from the target stream 1008 as the chunks are built from chunk stream 1028 chunks. As chunks are added to the result stream 1050, the target stream 1008 loses the same amount of data. Once the result stream 1050 is completed the replace process is finished.

Note: only a portion of a chunk may be used to complete the result construction; the rest is discarded.

"Expand" Random Edit Process

Figure 10:
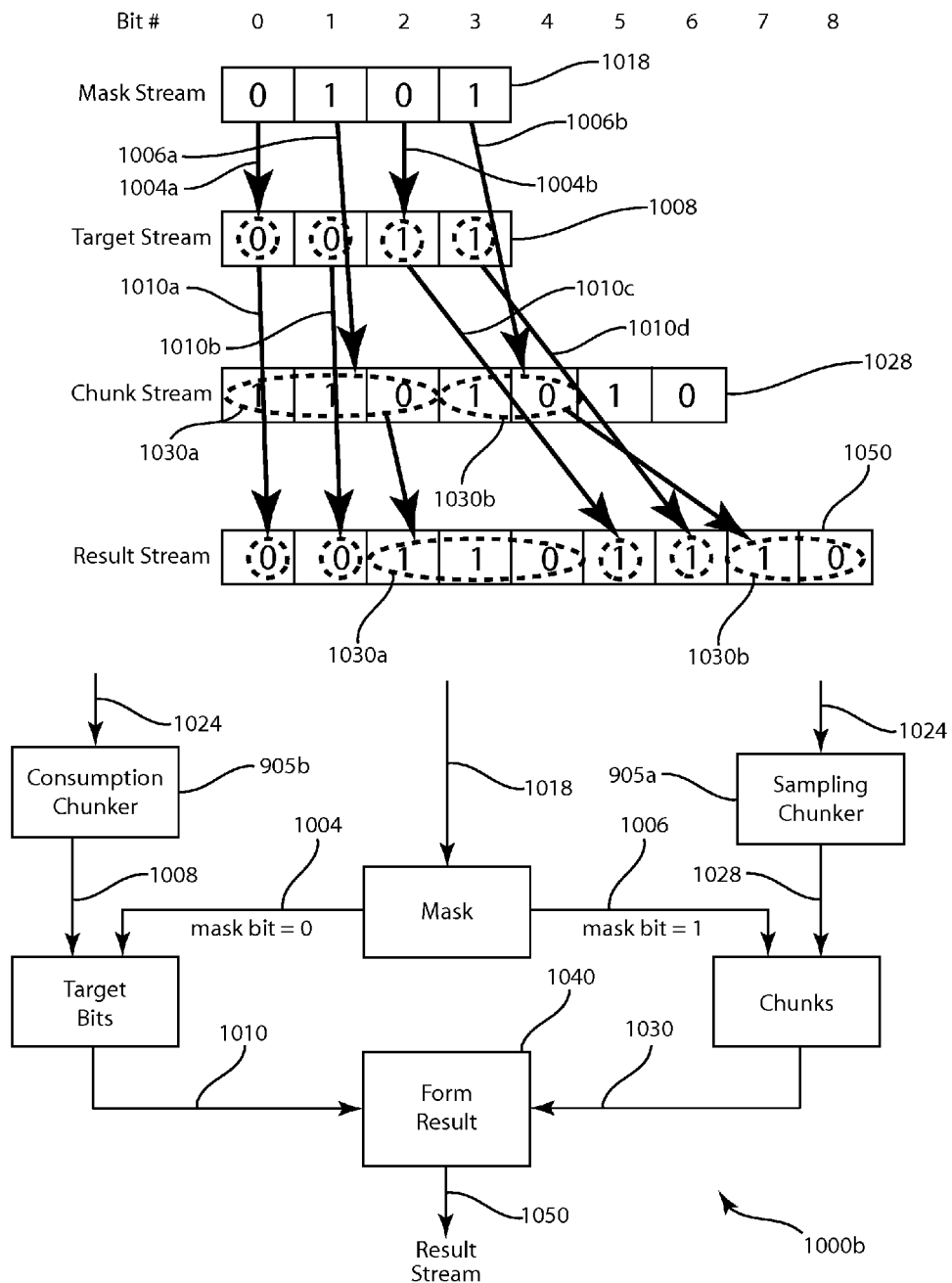
FIG. 10 illustrates bit manipulation during an Expand random edit process which is non-destructive in that each chunk is "inserted" between target stream bits, according to one embodiment of the invention.

FIG. 10 illustrates bit manipulation during an Expand random edit process 1000*b* which is non-destructive in that each chunk is "inserted" between target stream 1008 bits, according to one embodiment of the invention. The insertion point is defined by the mask value. Each chunk added to the target random stream 1008 increases the size of the target stream 1008 by the corresponding amount.

The Replace Random Edit Process 1000*a* does not expand the size of the result, while the Expand Random Edit Process 1000*b* does. In many ways, the Expand Random Edit Process 1000*b* is like the Mask Random Edit Process 600. For example, the primary goal is to not lose any data bits from the target stream 1008. As chunks from the chunk stream 1028 are inserted in between target bits, the result stream 1050 grows in size by the corresponding amount. There are five input parameters: target stream 1008, chunk stream 1028, mask stream 1018, expand right (or left), and chunk size. Clearly, a chunk size or mask value of zero means you simply return the corresponding target stream bits so that the operation becomes a NOP.

Expand Random Edit Processes 1000*b* will be documented without regard to real world limits on either the sizes of input parameters or the size of the result. Obviously, this is not the same in the real world. Each implementation must set reasonable upper bounds on their designs. In doing so, these upper bounds may cause side effects. It is assumed word size is the upper bound for target data stream, 1008, chunk data stream 1028, mask 1018, and chunk size, while the result 1050 is limited by result size.

The expansion can either take place to the left or right of the insertion point. Each "1" bit in the mask stream 1018 represents an insertion point. The result value 1050 is built up from target data stream 1008 as the chunks are taken from the chunk data stream 1028. The expansion is completed when one of the following conditions has been met: the mask has no more insertion points or the target stream 1008 has no more bits. Many additional 3-operand edit functions would fit within this architecture. This is an open-end architecture that can be easily extended.

"Remove" Random Edit Process

Given the same input mask random stream 1018, the Expand/Remove random edit processes are symmetric opposites. Each chunk added to the target input stream 1008 via the Expand random edit process 1000*b* is removed via the Remove random edit process, assuming the same mask edit stream is used for both operations. In this way, the target input stream 1008 is hidden among the spurious data chunks or "noise", and then recovered after the "noise" is removed.

Summary of Random Edit Processes

Not all Random Edit Processes make sense for all designs. Clearly, software has useful features like ALUs (Arithmetic Logical Units) and Barrel Shifters which make math and shifting operations efficient. However, burdening hardware designs with the same features would not be cost effective. So, the designer is encouraged to only use the Random Edit Processes that are cost effective for their products. The cost of "over-building" software designs is very low compared to over-building hardware designs. Once developed, the software cost remains very low in both run time and memory space.

Within this document many Random Edit Processes are discussed as a teaching tool. Now that the how and why Random Edit Processes work has been discussed, anybody trained in the normal arts can construct many additional Random Edit Processes and remain within the preferred embodiments.

Chaos Engine

1) Each random edit process can be viewed as an instruction that mutates random input streams. The dynamic switching between instructions defines a Chaos Engine, something analogous to a CPU. As the required random data volume dramatically increases, the Decoupling Process must become more aggressive to sufficiently decouple the data within the pool(s). This means replacing the simple Mask Generator with the Chaos Engine. Instead of one static Random Edit Process to hide the data, the Chaos Engine dynamically switches between multiple Random Edit Processes to decouple the data. Clearly, the Chaos Engine can be used to decouple either memory addresses or data. Each Random Edit Process within the Chaos Engine gives a different output based on its input values.

Figure 11:
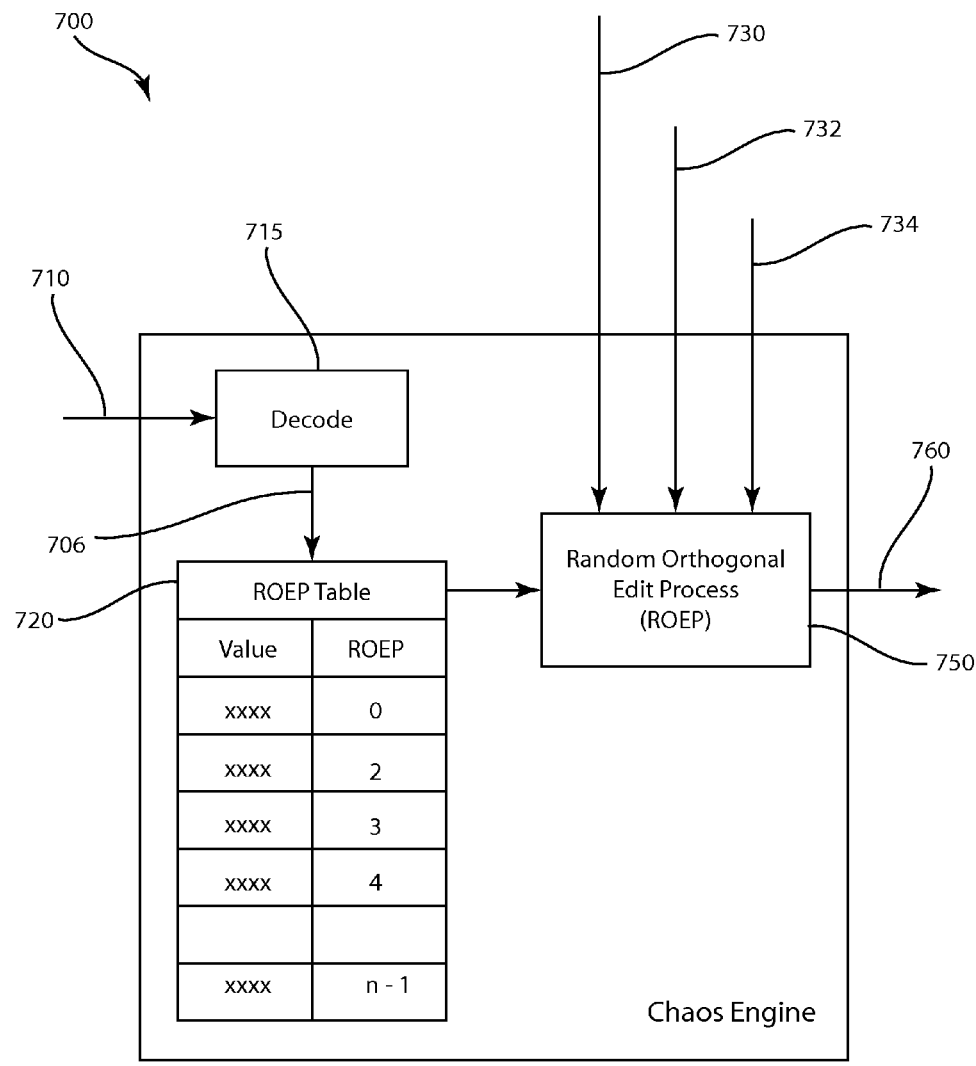
FIG. 11 is a system diagram depicting a chaos engine where an instruction is decoded and an appropriate random edit process is selected from an REP table according to one embodiment of the invention.

2) FIG. 11 is a system diagram depicting a chaos engine 700 where an instruction 710 is decoded 715 and the appropriate Random Edit Process 750 is selected from a Chaos Engine REP instruction set 720 which is a subset of the REP table according to one embodiment of the invention. Each Random Edit Process 750 within the Chaos Engine 700 gives a different result 760 based on its input values.

The Chaos Engine 700 has at least four random streams as input. At least one of these streams must be designated as the instruction stream 710. The instruction stream 710 is decoded 715 to select which instruction 706 to execute Like most Random Edit Processes 750, there is a data0 730, data1 732, and mask 734 as inputs. Clearly, the instruction stream 710 is an additional random stream from the data pool, like an Indirect Random Stream or some other data driven source. The Chaos Engine 700 has become something analogous to the ultimate RISC (Reduced Instruction Set Computer) processor. Though it is only a small number of simple instructions, the result completely shrouds the data pools.

Like all Random Edit Processes, neither the instruction nor edit streams are visible in the output stream. Here is an example of a simple 16 instruction (4-bit instructions) Chaos Engine:

| | | | |
|---|---|---|---|
| Sub0: | Result | = Data0 − Data1; | // standard math subtract operation |
| Sub1: | Result | = Data1 − Data0; | // standard math subtract operation |
| Mask0: | Result Generator | = (~Mask & Data0) \| (Mask & Data1); | // normal mask |
| Mask1: | Result Generator | = (Mask & Data0) \| (~Mask & Data1); | // the other mask |
| Comp0Mask: | Result | = (~Mask & ~Data0) \| (Mask & Data1); | |
| Comp1Mask: | Result | = (~Mask & Data0) \| (Mask & ~Data1); | |
| Comp0: | Result return it | = ~Data0; | // complement data element and |
| Comp1: | Result return it | = ~Data1; | // complement data element and |
| OR: | Result elements | = Data0 \| Data1; | // bitwise OR between two data |
| Xor: | Result elements | = Data0 ^ Data1; | // bitwise XOR between two data |
| And: | Result elements | = Data0 & Data1; | // bitwise AND between two data |
| Add: | Result | = Data0 + Data1; | // standard math add operation |
| Comp0Or: | Result between two data elements | = ~Data0 \| Data1; | // Comp Data0 then bitwise OR |
| Comp1Or: | Result between two data elements | = Data0 \| ~Data1; | // Comp Data1 then bitwise OR |
| Comp0Xor: | Result between two data elements | = ~Data0 ^ Data1; | // Comp Data0 then bitwise XOR |
| Comp1Xor: | Result between two data elements | = Data0 ^ ~Data1; | // Comp Data1 then bitwise XOR |

Surprisingly, though it represents many more gates than the Mask Generator, it has few gates overall for what it accomplishes. This simple Chaos Engine decouples the data within the pool(s) intended for much larger random data requirements and should only be used for that volume of required data.

Beyond these 16 defined here, different and/or additional instructions (Random Edit Processes) can be used while staying within the preferred embodiment. If we start with differentiated cycle lengths of the input streams, then the Chaos Engine cycle length is the product of each input cycle length times the Data Pool size. Given that we are decoding bits from the pool of uncertainty as instructions, the number of instructions per chaos engine is a power of 2.

Short Cycle Chaos Engine

As noted above, a Chaos Engine uses uncertain data as instructions to dynamically select between processing functions. The Short Cycle Chaos Engine also invokes the control plane as part of the Decoupling process. Each processing function still requires uncertain data as input parameters. While the above Chaos Engine assumes one instruction to produce one result, the short cycle chaos engine is based on one instruction producing multiple results. As the name implies, the sequence of results is assumed to be relatively short in number and these multiple results are limited to internal use only (i.e. they are paradox unsafe). Limiting multiple results to internal use only is required to prevent the possible modeling of these sequences; otherwise, a attacker may gain insight into the pool of uncertainty.

The following is an example of a short cycle chaos engine. A group of Linear Feedback Shift Registers (LFSRs) are defined to use a common seed value, short cycle count, and a selection value to pick which LFSR to start. Each of these input parameters comes from the pool of uncertainty. At the end of the given sequence, the next LFSR value is used as a memory address into the pool of uncertainty to read the next seed value, run count, and selection value. In this way, the short cycle chaos engine expands the uncertain seed value for a "short" number of relatively uncertain values, and then picks a new seed value, function selector, and sequence count, to create another unknown short sequence. As this process continues, a "relatively uncertain stream" is produced. This stream can be used as addresses and uncertain data source.

Displacement in Time

The Random Edit Processes in the form of the Mask Generator is a simple means to destroy the first order "melody". While eliminating the first order "melody", we have constructed a second order "melody". For review, "melody" is the reproducible output from a random value generator containing both values and the order in which they are created. The addition of two more PRNGs address generators with an output memory buffer gives us another tool to destroy the second order "melody". This tool is called Displacement In Time.

Figure 12:
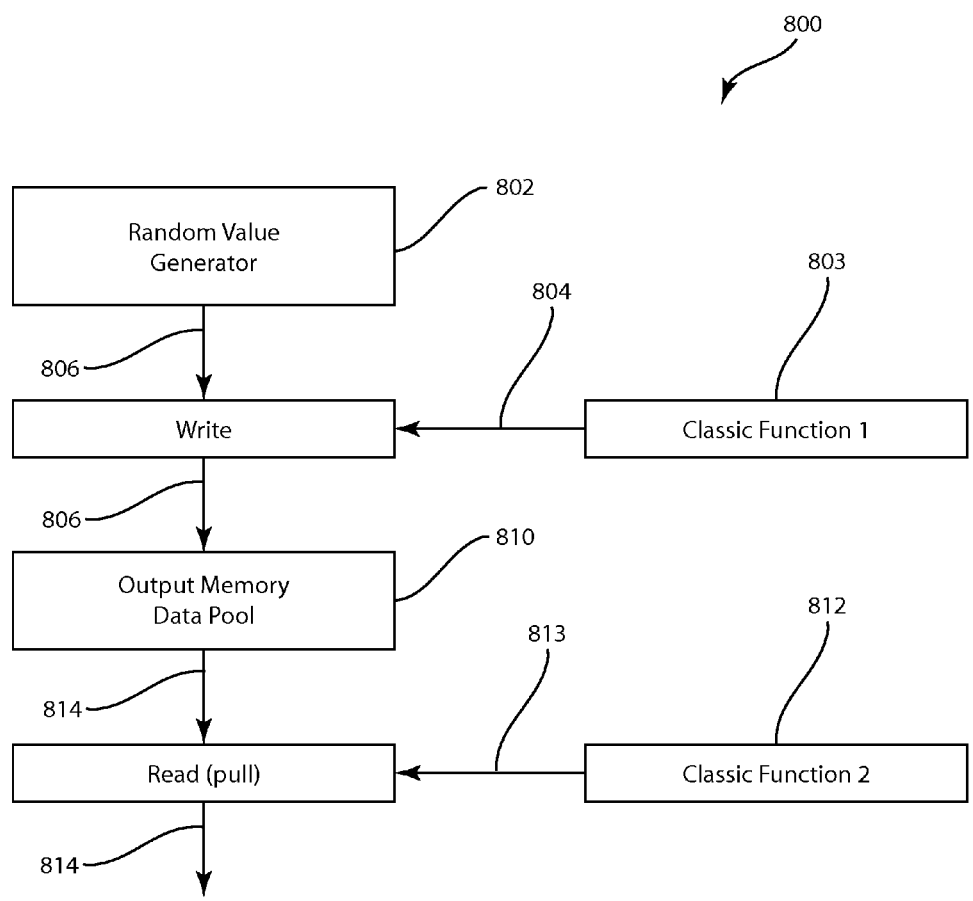
FIG. 12 is a system flow diagram depicting a displacement-in-time process using two classic functions to generate write and read (pull) addresses according to one embodiment of the invention.

FIG. 12 is a system flow diagram depicting the displacement-in-time process 800 using two classic functions to generate random write and read (pull) addresses according to one embodiment of the invention. A first classic function 803 generates a random write address stream 804. The data value 806 generated by the random value generator 802 is written to an output memory data pool 810 at the corresponding write address. A second classic function 812 generates a different random address stream 813 which is used to pull output values 814 from the corresponding address of the output memory data pool 810. This creates a new random data stream of output values 814 which is decoupled from the output 806 of the random value generator 802.

Each value produced in the output stream 806 is randomly saved into the Output data pool(s) 810. A different random address 813 is used to pull values from the output memory pool 810. By intelligent use of random addressing, we can shatter the remaining "melody" by decoupling the creation order of output values from the visibility of these output values. Here are some useful side effects of the Output pool:

The output from a random value generator may be overwritten before it is visible in the output stream.

The same Output pool address may be pulled multiple times before it is overwritten with a new value.

All output from random value generator is randomly displaced in time or destroyed with respect to when it was created.

With Displacement In Time, we have exorcised the last of the "melody" by using the Output data pool(s), while the data pool(s) remains shrouded. Initialization of the Output pool(s) is done at the same time as the data pool(s) is loaded.

Short Cycle Process

Figure 13:
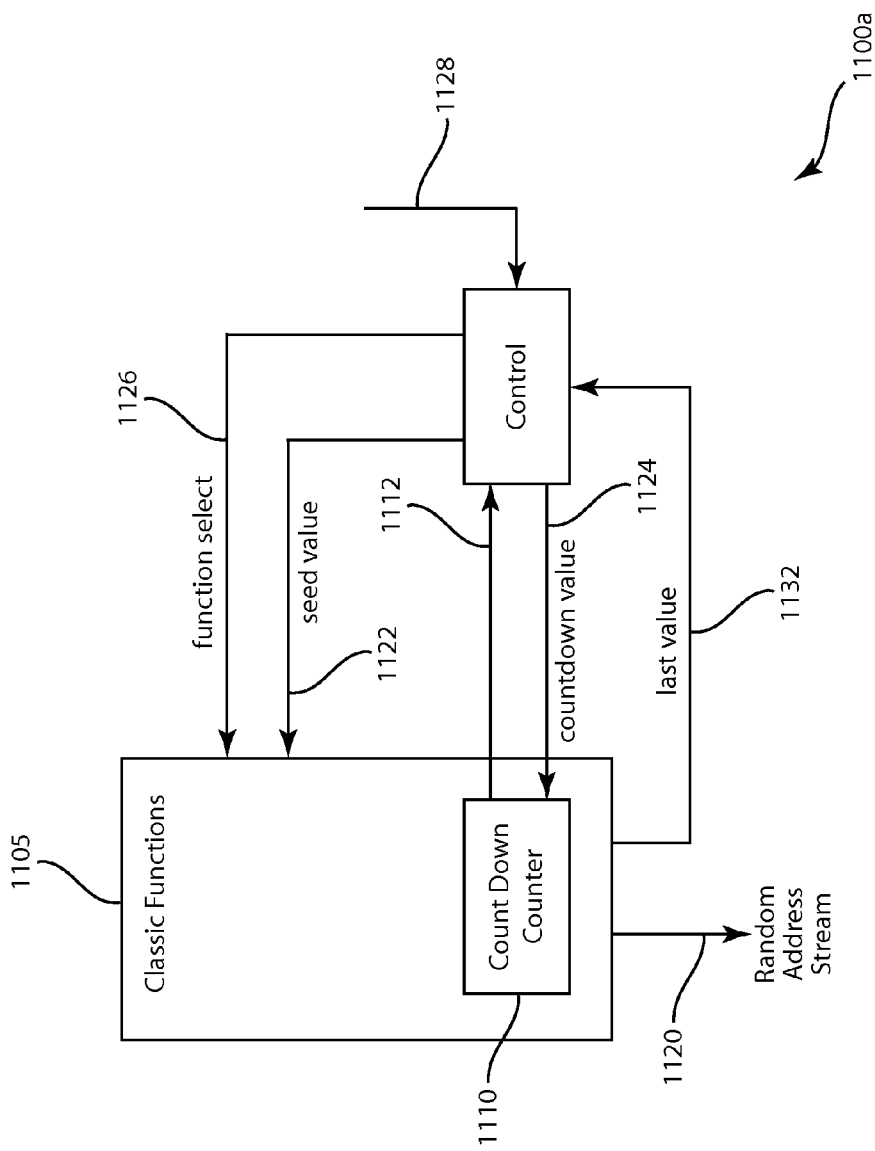
FIG. 13 is a system flow diagram depicting a short cycle random edit process that generates a random address stream according to one embodiment of the invention.

FIG. 13 is a system flow diagram depicting the short cycle process 1100a that generates a random address stream 1120 according to one embodiment of the invention. A classic block 1105 with multiple input control values, function select 1126, seed value 1122, and countdown value 1124 form the basis for the short cycle process 1100a. Each short cycle process 1100a has a small countdown counter 1110 for how many addresses (or values) are to be produced before another function reselection 1126 takes place. Each time a reselection 1126 takes place, a new uncertainty seed value 1122 is also used. In this way, an attacker cannot model the random addresses 1120 used to pull values from the data pool. Also, the reselection process reloads a new countdown value 1124. An initial start value 1128 is input to control unit 1130 which calculates the function select value 1126, seed value 1122, and countdown value 1124. When the countdown counter reaches the end of the specified countdown value 1124, the countdown counter communicates to the control unit 1130 that the last output value of the random address stream 1120 has been generated. The last output value 1132 of each countdown run is used by the control unit to calculate the next set of control values, seed value 1122, function select 1126, and countdown value 1124.

It is evident why the short cycle process 1100a effectively decouples addresses and data—the rate of change remains too rapid to model which random function 1105 is generating addresses 1120. In addition, the use of uncertainty data to define function countdown value 1132, run length count 1124 means that addressing cannot be modeled. This small amount of uncertainty data has removed much of the signal in the normally pseudorandom functions. The use of uncertainty data has replaced most of the certainty that was defined within these static functions.

Solving the Data Paradox

The uncertainty function built out of the data pools is a solution so long as data within the pool remains hidden. Clearly, linear addressing into the data pool should be avoided whenever possible. We are faced with a paradoxical situation: how do we pull data from the data pool without exposing the contents of the pool? This is defined as the data paradox. If we have an infinite data pool with good random data, the paradox does not exist. Since we never hit the end of the "infinite" data within the pool, we therefore never expose the full contents of the pool. You will note an ironic twist to the Data Paradox problem/solution: the uncertain random data in the pool(s) are simultaneously part of the problem as well as part of the solution.

In the real world, we are forced to deal with limited data pool sizes and hard random data requirements. If the random data required by the target application is modest compared to the data pool size, then the paradox is insignificant. As the random data required by the target application grows, so does the risk of the data paradox. Clearly, just growing the real size of the data pool(s) quickly becomes ineffective.

Since we cannot change the application requirements, we must somehow "synthetically grow" the virtual data pool(s) size in response to the effect of the data paradox. As random data requirements grow, the application will eventually outgrow each current solution and require upgrading to a more complex architecture. Each upgrade requires a higher cost solution that preserves the strength of the uncertainty function.

The preferred embodiments range from simple architectures to more complex solutions dependent on the system requirements. Each upgrade requires a higher cost solution than preserves the strength of the uncertainty function. For economic reasons, care must be taken to size the application to the correct embodiment.

Upgrading software solutions achieves a low cost solution compared to hardware solutions. Therefore, it is assumed that most software applications will start with more complex solutions, only downgrading to something else if and only if the overall system performance becomes an issue. As the amount of random data required increases, it is more likely that the software system designer will require dedicated hardware to generate random values.

Raw data is never simply pulled from the data pool, making it visible in the output stream. That raw data exposes the contents of the pool far too quickly. By now, you know the problem with linear addressing into the data pool. Even pseudorandom addressing into the data pool remains too simplistic, and is almost as bad as linear addressing into the data pool.

The Decoupling Process

The words, safe or unsafe, are used to describe attributes of values which impact the data paradox. Specifically, the unsafe values have not undertaken the Decoupling Process while safe values have. The function of the decoupling process is to convert deterministic stream of values into a non-deterministic stream of values.

The goal of avoiding the data paradox influences most of the building blocks described below. The Decoupling Process transforms raw data pool memory addresses and data into paradox safe values. These values are transformed by mixing uncertain data with these original values. Only safe values can be used without the ill effects of the data paradox.

The effect of the decoupling process is to synthetically grow the virtual data pool size. While we can dramatically grow a substantial data pool into a massive virtual pool, we do not quite reach that infinite pool size. Clearly, this virtual growth only works on a reasonably sized data pool. Specifically, if a data pool starts out too small, it cannot be repaired via synthetic growth.

When we wish to create a virtual data pool, its size dictates how aggressively we will decouple the memory addresses and the data. Though the Decoupling Process starts very simply, it grows in complexity as needed. The Decoupling Process becomes more aggressive over the range of embodiments.

The transition between each embodiment is not a clearly defined point. Normally, the strength of the uncertainty random value generator does not suddenly fail at one additional random value produced; instead, it slowly weakens until the hidden data within it becomes visible. Obviously, we should never drive an embodiment until it becomes this weakened. To avoid this, the designer should incorporate a margin of safety.

Many factors influence resistance to cracking for each embodiment. Of these factors, the most obvious is data pool size. In addition to data pool size, other major factors driving the margin of safety comprise: the number of random functions found in each classic block, the total number of Random Edit Processes within the design, the "freshness" of the pool data, and the total cycle length of the new genome generator.

The designer should simulate the random value generator to see which factors give the best value for a margin of safety. Tools to decouple addresses and data comprise:
1) The exclusive-OR (XOR) with uncertain data—addresses and data
2) The Mask Generator with uncertain data—addresses and data
3) The Chaos Engine with uncertain data—addresses and data
4) Displacement-in-time—data only Unsafe pseudorandom memory addresses are made safe via a range of solutions including a simple XOR process to a complex solution such as a Chaos Engine. Data pulled from the pool is raw (addressed via unsafe pseudorandom memory addresses), unsafe (addressed via safe memory addresses), or safe (Decoupled via one of the above processes). Data is made safe via the Mask Generator through Displacement In Time. In summary, data pool addresses have two valid states:
1) "Paradox Unsafe"—addresses created via classic functions
2) "Paradox Safe"—addresses completed the Decoupling Process While data pool data elements have three valid states:
1) "Raw"—data pool data accessed via Unsafe addresses
2) "Paradox Unsafe"—data pool data accessed via Safe addresses
3) "Paradox Safe"—data pool data completed the Decoupling Process Common Design Issues Unfortunately, classic PRNGs provide limited functionality. As the only current means available, these limitations are fraught with inappropriate solutions. For example, resistance to cracking is addressed with massively complex PRNG solutions, which leads to runaway costs. Many designs are constructed in secret in a vain attempt to hide their implementation. This secret development blocks review and reuse while the fatal flaw of PRNGs remains—they are deterministic. Thus, any current PRNG solution has a limited life span.

As we understand the examples, many different designs can be created from these standard components. This components-level creation of solutions allows us to properly scale any solution to the application requirements while limiting the costs.

As a non-limiting example, one may randomly select two uncertain data values from the pool and add them together, which results in a new uncertain value. This new value is decoupled from the values of its parents, as a plurality of different parent sets can result in that same value. A single pool of values can therefore generate a second generation pool of uncertainty that is larger than the first. The attribute of "uncertainty" has carried forward to the next generation of values. So, while one should not reveal first generation uncertain data, one can release subsequent generations that have been processed from it.

There are an unlimited number of valid operations besides "adding" that can be done with uncertain data to generate additional uncertain data that leads to the next implication of uncertain data. While the first generation of uncertain data has a fixed size, subsequent generations can be of arbitrary size.

So, how large is the first generation pool of uncertainty? While this remains a completely fair question to ask, the answer is not straightforward. Distinct applications require different amounts of random data. The target volume of random data has limited impact on the data pool size above a reasonable base line size, but does have a major impact on address generation used to access the data pool. Deliberately, the minimum size of the pool of uncertainty has not been defined. This minimum size value is unimportant. While the price of memory continues to decline quickly, it still represents a cost to be managed. However, a designer can compute the data pool sizes with simulations of their designs. As the target volume of random data increases, the direct impact on the data pool size remains minimal. Surprisingly, there is a reasonable upper limit to the data pool size based on chip size vs. cost. So, increasing the data pool size beyond this reasonable limit does not justify an increased expense.

The essential principle of uncertainty remains the primary reason for not using a minimal data pool. Maximizing uncertainty implies that any given data value may appear multiple times within the data pool. To incorporate additional uncertainty, each duplicate value found in the data pool dramatically increases the uncertainty of which memory address produced a given value. The difficulty of the inversion process escalates exponentially due to this increased uncertainty. Of course, this assumes that the session data still passes the validation process and remains hidden.

Thus, by removing certainty within the design, we can replace it with uncertainty. Instead of using a minimal handful of classic PRNG for address generations, we require larger group(s) of classic functions, beyond the minimum number.

PRNGs are used for address generation within the URNG. When applications require modest amounts of random data, the allocation of PRNGs can be done once. As the random data requirements go up, so does the risk to successfully modeling these PRNGs. A good defense to this modeling would be dynamic (uncertain) selection of PRNGs. The use of one time or dynamic selection of PRNGs becomes a complexity trade-off decision. In hardware designs, requiring software initialization to do one time PRNG selection does have an impact. In this instance, the addressing function must have a longer cycle period than the target application random data requirements, to prevent reusing the same output sequence. Added complexity may be required to ensure the proper addressing cycle length.

Dynamic (uncertain) selection of PRNGs life spans does add complexity to selection/reselection of addressing functions, run lengths, and seed values. Assuming the uncertain run length is relatively small, a minimum cycle length addressing function can be used. In this way, the dynamic replacement of addressing functions assures that random sequences are not repeated. The shorter this run length life span is, the harder the generator is to invert. Clearly, this is the preferred design trade-off for large or unknown random data requirements.

Protecting the uncertainty of the URNG depends upon the decoupling of both addresses used to read from the data pool and the data itself. Care has been taken in this specification to ensure maximum uncertainty. Short of a direct attack on the pool of uncertainty, the next best way to glean the contents of the pool of uncertainty is successful modeling of the random addresses used to read from the data pool(s). Addresses must also be decoupled in order to block this form of attack.

Obviously, hardware designs are sensitive to per unit costs. But, while hardware designs do have higher costs; they also have the advantage of better performance. On the other hand, software implementations have both lower costs and performance, but gain in flexibility. Depending upon random data and performance requirements, each design center has advantages over the other. In this specification, the range of examples only represents starting outlines of possible implementations. The lowest cost solution is not always the best solution for each application.

Except for displacement in time, all decoupling processes use uncertain data to decouple input values. This blending process removes some/most/all the "melody" of the input values. To what extent the "melody" is removed becomes a cost/performance tradeoff. This explains why the lowest cost solution many not be the best. The careful section of which tradeoffs to make is why one size does not fit all application requirements.

Memory bandwidth into the pool of uncertainty drives many hardware tradeoffs. A higher number of accesses to the pool of uncertainty per generator results in the effect of limiting the performance of the random number generator. Luckily, there are many well-known workarounds to this memory bandwidth problem (multiple pools of uncertainty, etc), unfortunately, all of these workarounds drive up costs.

Software performance is already limited by memory bandwidth, so the complete removal of all "melody" of input values becomes a recommended design goal.

Each URNG design must decouple both addresses and data from the pool of uncertainty. Defining the engineering task for any URNG, the effort's effectiveness is directly proportional to its cost. The usefulness of each decouple/random edit process varies by effect and complexity (i.e. cost). As the edit data comes from the pool of uncertainty, a random edit process is upgraded to a decouple process. Its broad effects deal with the possible cycle length and relative determinism of each produced value. When all of the "melody" has been removed (making the values nondeterministic), the only additional useful effect is natural cycle length. A designer must select between these broad effects according to engineering tradeoffs.

Level 1 Decouple: (removes only some of the "melody" of the input stream) bit-wise exclusive-or (XOR) with an uncertain data value. The effect is a less deterministic produced value.

Level 2 Decouple: (removes all of the "melody" of the input streams) a mask generator with an uncertain mask. The effect is a nondeterministic produced value (a paradox safe value).

Level 3 Decouple: (removes all of the "melody" of the input streams) a chaos engine with uncertain instruction and mask streams. The effect is produced values that are nondeterministic with a very long cycle length.

The standard outline of each URNG has three steps. The uncertainty function requires both decoupled addresses (domain values) and data (range values) to produce a nondeterministic stream.
  a. A PRNG is used to produce addresses to read from the pool of uncertainty. Thus, producing the raw, paradox unsafe, uncertain stream. As unsafe values, they are restricted to internal URNG use only.
  b. PRNGs produce addresses are decoupled (Level 1=>3) to produce data pool addresses. These paradox safe addresses (domain values) read from the pool of uncertainty. Thus, producing paradox unsafe data (range values) from the pool of uncertainty.
  c. The paradox unsafe data (range values) are decoupled (Level 1=>3) to produce nondeterministic output stream.

All applications that use URNG designs should never cycle completely through the supported total cycle length of the generator.

Hardware Building Blocks

One of the goals is to radically drive down the cost of random value generation. To that end, publicly reviewed standard hardware building blocks (classic functions) are reused in each design. Each of these blocks is based on simple concepts explained in the following sections. Once built, these blocks can be reproduced throughout many designs as needed.

Many of these building blocks are defined as hardware abstractions. Although hardware may not normally be defined in this manner, in this case it is done to give the widest possible leeway in its implementation. These abstractions, as opposed to fixed implementations, are the power behind this technology. Someone skilled in the field of chip design can easily implement these abstractions while staying within the embodiments of the invention.

The use of building blocks allows us to mix functions into a wide range of solutions as needed. These embodiments are general examples that can be added to or changed, as various applications require. Provided you do not over-build your design, the goal of driving down the cost of random value generation is satisfied.

An uncertainty random value generator abstraction has been described as pulling data values from one or more data pools. The deliberately vague term "pull" indicates that addressing into the data pool is not yet defined for this abstraction. This vague term "pull" will now be expanded into something more useful.

To pull data from the pool, the elements governing the creation of random addresses include: the total random cycle length required by the application, the data pool size, the general idea of uncertainty, and effects of the data paradox. Most of the overhead is expended during the process of creating these random addresses within the uncertainty random value generator. After all, reading memory is still a very inexpensive means to get data.

When matching application requirements to the uncertainty random value generator design the first question to answer is, how much random data is required? This target value represents the minimum total necessary cycle length. We must generate random addresses that have a longer cycle length than the given application requirement. Using one or more random edit processes gives us the means to achieve this longer cycle length.

So, how big is the Data Pool? Applications require different amounts of random data. The target volume of random data has limited impact on the Data Pool size above a reasonable base line size, but does have a major impact on address generation used to access the Data Pool(s). Therefore the designer should perform simulations to determine the optimal data pool size for their application.

The uncertainty random value generator starts with session data in one or more data pools. Deliberately the minimum size of the data pool is not defined because the minimum size is unimportant. However, the designer can compute the data pool's sizes with simulations of their designs. As the target volume of random data increases, the direct impact on the data pool size remains minimal. Surprisingly, there is a reasonable upper limit to the data pool size based on chip size vs. cost. So, growing the data pool size beyond this reasonable limit does not justify an increased expense.

The principle of uncertainty is the primary justification for not using a minimal data pool. Maximizing uncertainty implies that any given data value appears multiple times within the data pool. To incorporate additional uncertainty, each duplicate value added to the data pool dramatically increases the uncertainty of which memory address produced a given value. The difficulty of the inversion process escalates exponentially due to this increased uncertainty. Of course, this assumes that the session data still passes the validation process and remains hidden.

Thus, by removing certainty within the design, we can replace it with uncertainty. Instead of using a minimal handful of classic functions for random address generations, we define larger blocks of classic functions, while only using one function at a time per block. The design and use of classic functions blocks with addressable output routing means that any classic function can be used in all parts of the random value generator design. The fact that all classic function selection, seed values, and output routing are all driven by the data from the uncertainty function means that certainty has been replaced with uncertainty. While these features are simple and low cost to implement, they dramatically drive up the uncertainty of the design.

The Classic Block

A Hardware Abstraction

Earlier, it was explained why we have a one-way function while reading from data pools: the same session data gives a unique data stream for each unique addressing methodology used to access the data pool. It is important to have as many unique addressing methodologies as can be afforded by the design.

Fortunately, hardware Linear Feedback Shift Registers LFSRs (classic hardware random bit-value generators) are both numerically plentiful and small in required gate count to implement. There are certainly hundreds, perhaps thousands of published hardware shift-registers available. With the use of Random Edit Processes, we can construct longer cycle shift-registers from those with shorter cycle lengths. An important note about classic blocks—each LFSR is normally used to produce unsafe memory addresses.

In defining this hardware abstraction, our goal is to maintain a common abstracted interface to the building block while allowing the implementation within the building block to change as necessary. Each classic Block has four required input values: seed value, function selector within the block, run length count, and output line selector to route the output bit stream. (There are other common control lines as well, such as reset, load seed, etc).

Common Interface Issues for all Classic Blocks

Figure 14:
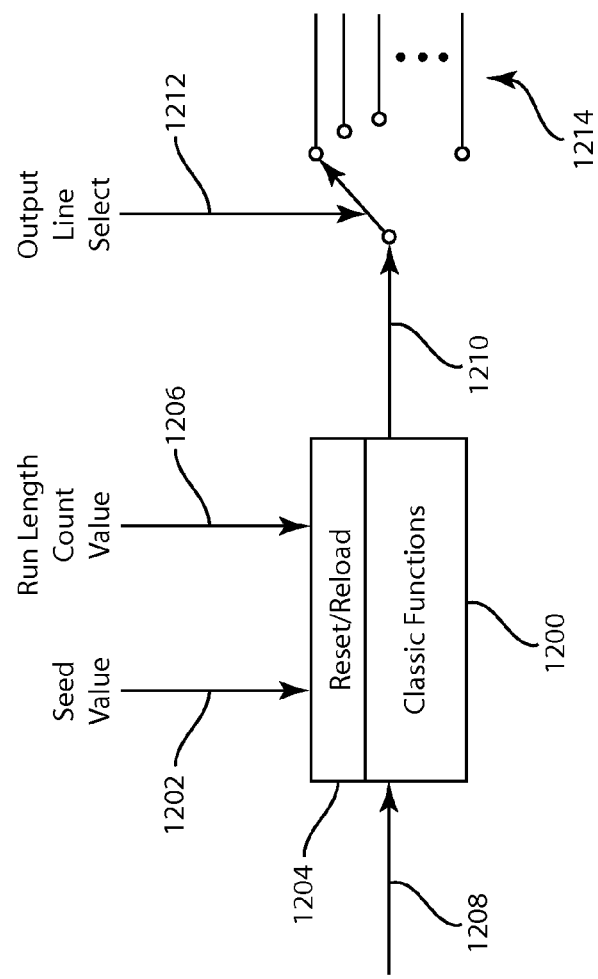
FIG. 14 is a system diagram depicting the common interfaces associated with classic blocks according to one embodiment of the invention.

FIG. 14 is a system diagram depicting the common interfaces associated with classic blocks 1200 according to one embodiment of the invention. The seed value 1202 is always loaded in the same manner. The next (new) seed value 1202 and run length count 1206 can be loaded while the current shift-register function is running. A reset and reload 1204 is required to switch to the new seed 1202 and run length count 1206 values. The output line selector 1212 is used to switch the output stream 1210 from the classic block 1200 to the appropriate output line 1214. The appropriate classic (function selector) shift-register for use within the classic block 1200 is always specified in the same manner. Once the classic function is selected, the seed value 1202 and run length count 1206 value are loaded and the function begins to generate the output stream 1210 which is routed to the selected output line 1214.

In order to drive random edit processes, the classic blocks are most likely to be used in groups. The common interface makes the other hardware much simpler. By allowing the output bit-stream to be dynamically routed to the correct Random Edit Processes, we have greatly expanded the number of unique addressing methodologies used to access the data pools.

The initialization of each classic block starts with a data pool memory address. That memory address points to two values: the seed value and the run length count. The initialization hardware fetches the two values. At the end of the Run length count, the next random value becomes the next data pool memory address. The value at this data pool memory address is then used to determine the new seed and run length count values used to restart the classic block.

Now, the value of looking at a design as an abstraction is made even more obvious. Within the above classic block abstraction, a requirement for multiple LFSR was made clear. As an abstraction, this implementation is much cheaper than the straightforward solution. As discussed above, the straightforward approach would have us create multiple unique LFSRs to construct the classic block. However, this approach would be costly in gate count, so the overall goal of driving down the cost of random value generation would fail. Instead, by using the classic block abstraction, we gain the freedom to solve this problem by any means we choose.

For example, rather than spend all those gates on all the LFSRs, we create one programmable configurable LFSR for each classic block. Using uncertainty values to select and configure the LFSR meets the functional requirements of the classic block abstraction without paying the full price in gate count. Once again, this approach preserves the goal of driving down the cost of random value generation without affecting the overall architecture.

Grouping Shift-Registers into a Classic Block

One must be careful when grouping shift-registers into a classic block. Table 2 presents a set of classic shift-registers grouped by arbitrary Name (color in this case), Group Size number of shift-registers in this group, Cycle Length for the group, and discriminating whether the named function group is a Mask Generator.

The Random Edit Process results in a much longer cycle period if, and only if, differentiated cycle lengths are used for each input stream. Thus, shift-registers must be grouped in such a way as to preserve these differentiated cycle lengths. Each P value in the table or the product of three P values is a unique value. While one can't view the unique P values in this teaching example, the table is generally formatted with increasing P values.

TABLE 2

| Name | Group Size | Cycle Length | Mask Generator |
|---|---|---|---|
| Red | 14 | P1 | No |
| Green | 12 | P2 | No |
| Blue | 8 | P3 | No |
| Black | 16 | P4 | No |
| White | 11 | P5 | No |
| Teal | 9 | P6 | No |
| Gray | 13 | P7 | No |
| Purple | 16 | P8 | No |
| Indigo | 16 | P9 | No |
| Yellow | 10 | P10 | No |
| Violet | 12 | P11 | No |
| Orange | 14 | P12 | No |
| Magenta | 22 | P13 | No |
| Aqua | 14 | P14 | No |
| Azure | 11 | P15 | No |
| Red-Green-Blue | 4032 | P1*P2*P3 | Yes |
| Green-Blue-Black | 4068 | P2*P3*P4 | Yes |

TABLE 2-continued

| Name | Group Size | Cycle Length | Mask Generator |
|---|---|---|---|
| Blue-Black-White | 4224 | P3*P4*P5 | Yes |
| Black-White-Teal | 4752 | P4*P5*P6 | Yes |
| White-Teal-Gray | 3861 | P5*P6*P7 | Yes |
| Teal-Gray-Purple | 5616 | P6*P7*P8 | Yes |
| Gray-Purple-Indigo | 9984 | P7*P8*P9 | Yes |
| Purple-Indigo-Yellow | 7680 | P8*P9*P10 | Yes |
| Indigo-Yellow-Violet | 5760 | P9*P10*P11 | Yes |
| Yellow-Violet-Orange | 5040 | P10*P11*P12 | Yes |
| Violet-Orange-Magenta | 11088 | P11*P12*P13 | Yes |
| Orange-Magenta-Aqua | 12936 | P12*P13*P14 | Yes |
| Magenta-Aqua-Azure | 10164 | P13*P14*P15 | Yes |
| Magenta-Black-Purple | 16896 | P1*P4*P6 | Yes |
| Gray-Magenta-Red | 12012 | P7*P13*P1 | Yes |
| Azure-Red-Purple | 7392 | P15*P1*P8 | Yes |
| Gray-Black-White | 6864 | P7*P4*P5 | Yes |

Note that a Mask Generator is made up of three random streams, data0, data1 and mask. When mixing three colors from Table 2, the Mask Generator group size is the product of each color group size times three. Each function in each of the three-color groups can be the data0, data1, or mask stream. For example White-Teal-Gray has group sizes is 11*9*13*3=3861. So long as each color is represented in all three streams within the Mask Generator, the same Mask Generator cycle length is produced.

Some sample classic blocks can now be constructed. While each classic block has the same abstract interface, they can and do differ internally. Here are examples of six classic blocks made from the above table.

classic block 1: Magenta and Yellow
 Total Function Count in Block: 32 (22+10)
 Cycle Length Minimum, Maximum P10, P13
classic block 2: Red-Green-Blue
 Total Function Count in Block: 32 (32 of 4032 possible)
 Cycle Length Minimum, Maximum P1*P2*P3
classic block 3: Violet, Purple-Indigo-Yellow
 Total Function Count in Block: 32 (12+20 of 7680 possible)
 Cycle Length Minimum, Maximum P11, P8*P9*P10
classic block 4: Azure-Red-Purple
 Total Function Count in Block: 32 (32 of 7392 possible)
 Cycle Length Minimum, Maximum P15*P1*P8
classic block 5: Purple, Aqua, Black, Orange, and some of Teal
 Total Function Count in Block: 64 (16+14+16+14+6 of 9)
 Cycle Length Minimum, Maximum P4, P14
classic block 6: White, Azure, Gray, Green, Red, and some of Blue
 Total Function Count in Block: 64 (11+11+13+12+14+3 of 8)
 Cycle Length Minimum, Maximum P1, P15

There are a number of important properties to note about these classic blocks. First, any design can use these blocks and be assured that they have differentiated cycle lengths. Even though a color appears as part of the Mask Generator, the combined cycle length does not affect the base color cycle length. The total function count in each block can, and does vary from block to block. For common interface reasons, all classic blocks will have total function counts as a power of 2.

Mixing simple shift-registers with Mask Generators within a classic block does function correctly, this also greatly impacting the minimum cycle length of the block. Note the contrast between classic blocks 3 and 4. These sample classic blocks were created to show what issues should drive the grouping process. With care, very good classic blocks can be created with low gate counts and good cycle lengths while preserving the overall goal of differentiation of cycle lengths. In the above table, the Mask Generators listed are all stage-1 generators. Alternatively, higher stage generators could be added to the table and thus each classic block. In fact, this would be a very simple way to increase the total number of unique functions in the uncertainty random value generator.

Note that the classic block hardware abstraction provides us a common interface to these functions, while giving us basic construction tools to develop the whole range of architectural solutions.

Indirect Random Stream

Now that there are classic blocks to generate a raw, unsafe memory address, data can be read from the data pool(s). Defined as data paradox unsafe, the data read in this manner is only used internally and is referred to as an indirect random stream of values. Usually, this indirect random stream is applied to pull the random data used in various edit processes. It should never be used to directly feed the output stream.

Safe Address Streams

The uncertainty function built out of data pool(s) is a strong solution. Short of a direct attack on the data pool, the next best way to glean the data in the data pool(s) is to model the random addresses used to read from the pool(s). To block this form of attack, the random addresses must be decoupled in such a way that the addresses cannot be modeled.

The Decoupling Process starts here with the simplest transformation. Fortunately, the elegance of the uncertainty function comes to our aid in making safe random addresses. Each random (raw) address generated by the classic blocks can only be made safe through a data driven modification process. The modification of pseudo-random addresses with data from the pool(s) gives us a unique random address stream. This address stream cannot be modeled without first knowing the contents of the data pool(s). These deterministic addresses have been upgraded to nondeterministic via the Decoupling Process using uncertain data.

Figure 15:
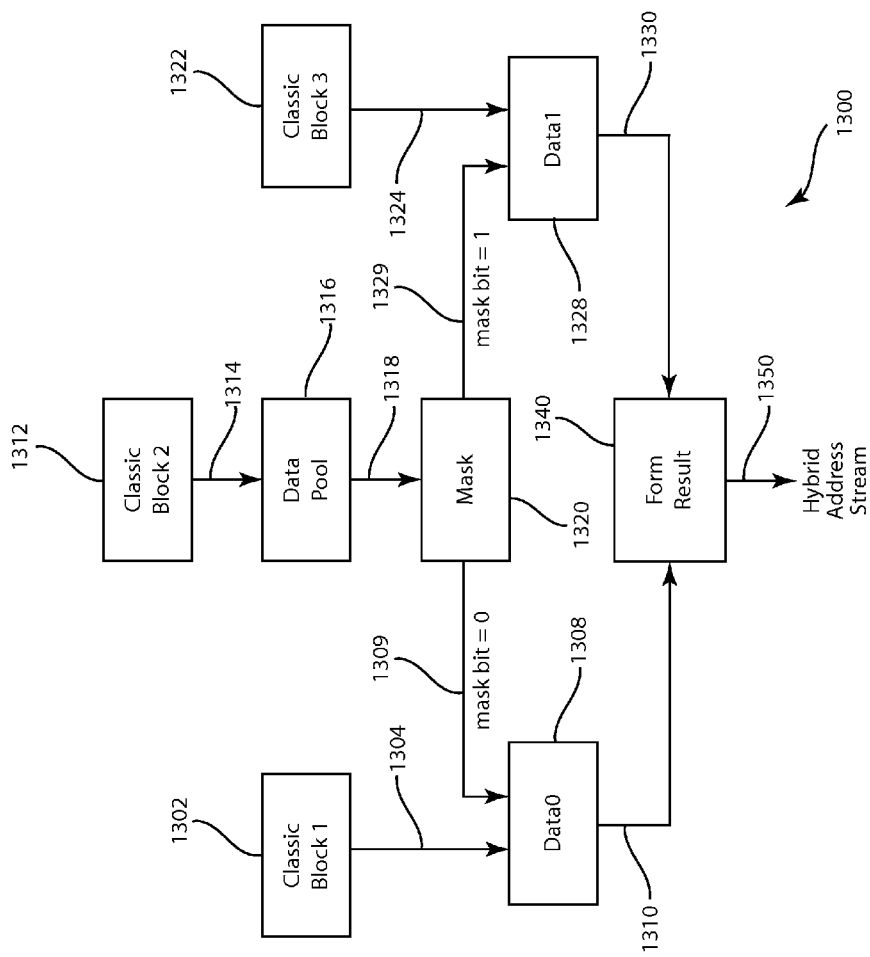
FIG. 15 is a system flow diagram depicting a Hybrid Address Generator which uses an indirect random stream of unsafe memory addresses to pull values from a data pool according to one embodiment of the invention.

FIG. 15 is a system flow diagram depicting a Hybrid Address Generator 1300 which uses an indirect random stream 1314 of unsafe memory addresses to pull values 1318 from a data pool 1316 according to one embodiment of the invention. This Hybrid Address Generator 1300 uses two classic blocks, 1302 and 1322, to generate the input streams for data0 1304 and data1 1324 respectively. Mask stream 1318 operates on data0 stream 1304 and data1 stream 1324 to form 1340 the resulting hybrid address stream 1350. The Hybrid Address Generator operation is identical to the Mask Generator 400 except for the indirect stream 1314 pulling data values 1318 from a data pool 1316. The Hybrid Address Generator 1300 produces data paradox safe random memory addresses 1350 to read from data pool(s). To create the hybrid address stream 1350 the net cost will be at least three classic blocks 1302, 1312, and 1322.

Figure 16:
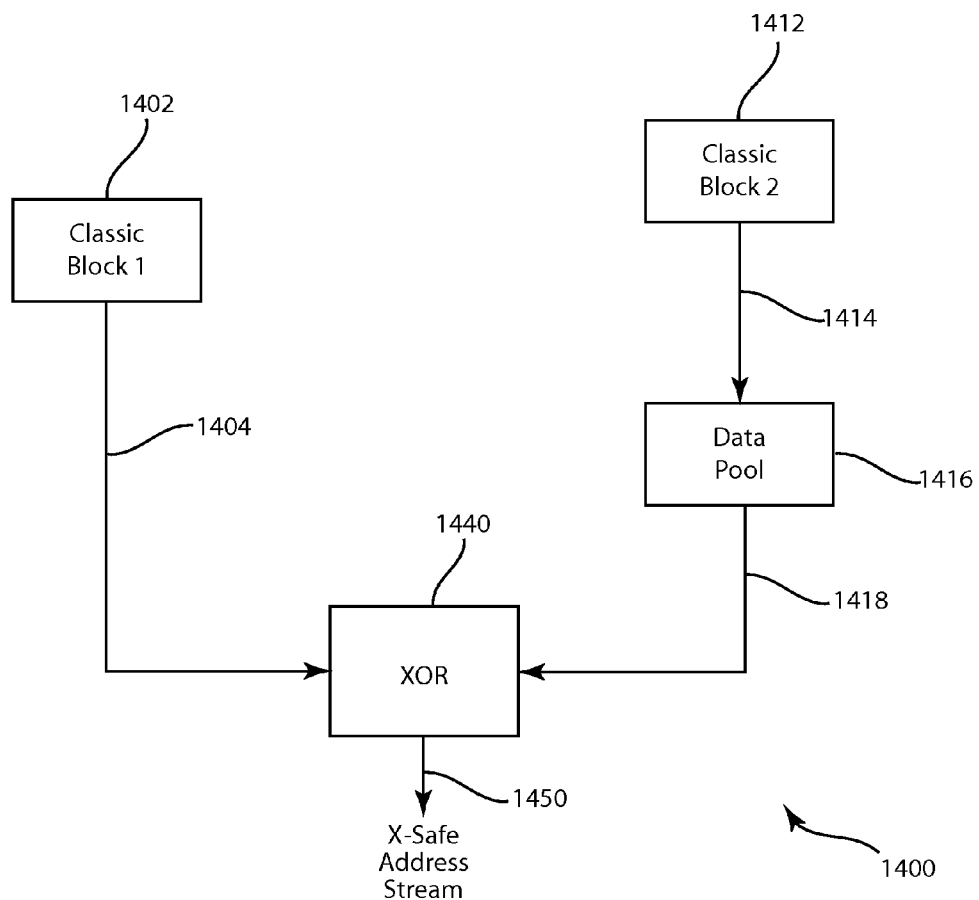
FIG. 16 is a system flow diagram depicting a second method of applying the uncertainty function to make data paradox safe random addresses referred to as the X-Safe Address Generator according to one embodiment of the invention.

Though it is both less costly and not as safe, FIG. 16 is a system flow diagram depicting a second method of applying the uncertainty function to make data paradox safe random addresses referred to as the X-Safe Address Generator 1400 according to one embodiment of the invention. One classic block 1402 is required to create the data0 1404 input stream. Simultaneously, another classic Block 1412 must be used to create the indirect random stream 1418. The output stream 1414 from the second classic block 1412 is used to index to a data pool 1416 to create the indirect random stream 1418 which is bit-wise XOR 1440 with the data0 stream 1404. The resulting random address stream 1450 becomes almost as safe as the Hybrid Mask Generator, but is more likely to have a shorter cycle length. To create the X-Safe Address Stream 1450, the net cost will be at least two classic blocks.

We can assume that any uncertainty random value generator should never cycle completely through the supported total cycle length of the generator. Therefore, the random address stream cycle length must exceed the total target application random data requirements. To reach the desired cycle length, stacking Random Edit Processes may be required. This stacking can be constructed within or outside the classic block.

Safe Random Data Streams

A Hardware Abstraction

The Decoupling Process continues with the safe random data stream. Using paradox safe memory addresses to read the data pools, three random data streams are created: data0, data1, and mask. The safe random data stream has successfully grown the virtual data pool size via the Decoupling Process of memory addresses and data. The data pool(s) can now produce many times their volume of random data without risk from the data paradox. This requires at least 6 classic blocks to feed this generator. Starting with differentiated cycle lengths of the input streams, then the save random data stream cycle length is the product of each input cycle length times the data pool size.

Dynamic Evolution of Session Data

The Decoupling Process continues with dynamic evolution of session data. Card games, starting with a fixed number of cards, provide us with a helpful metaphor for decoupling. Shuffling the deck creates a new game by setting up a new sequence of the cards to be dealt. In many cases, the deck is then "cut" to change the first card dealt. The act of shuffling and cutting the deck changes the sequence of cards to be played.

Likewise, the same principle can be applied to the session data. This result is to "refresh" the session data. Refreshing the session data not only adds uncertainty, the renewed session data helps hold the data paradox at bay. The "virtual" shuffle and cut is only done with memory addresses and acts to re-index the values found in the session data. While the data within the pool(s) still remains static, the addresses used to read the pool(s) are manipulated in a way to simulate "shuffling and cutting".

The Virtual Cut

Memory Address+Offset

For example, adding an offset of the memory address used to read the data pool(s) has the same effect as moving the origin of the memory range. This acts just like "cutting" the deck in a card game.

The Virtual Shuffle

Memory Address XOR Shuffle Value

The act of bit-wise XOR of a Shuffle Value with a memory address is comparable to the effect of a quick shuffle in place. The memory range has been reordered by the XOR operation. You can shuffle then cut, or you can cut then shuffle. These virtual card tricks can be performed as many times as you wish.

Random Sub-Streams

Using the Memory Address Offset

Manipulating the memory address can have some very useful side effects. Normally, the uncertainty random value generator would only produce one random stream. If each memory address used within the uncertainty random value generator had an offset added to it, then a different random sub-stream would be produced for each different offset. Any number of arbitrary random sub-streams can be produced via selective addition of memory-offset values. This gives us a random addressable sub-stream whenever it is needed. This tool is very useful in many applications.

Dynamically Changing Memory Address Lines

Another way to decouple the data pool contents is to change the hardware addressing lines dynamically. This is a general open-ended hardware solution. While this works, it may be too expensive to use in many designs.

The third plane-of-randomness can also be enabled within the hardware classic blocks. Each classic block is configured at initialization time with a seed value, a routing selection of the output bit stream, and a selection of which function to use within the block. Within a classic block, the dynamic runtime switching of seed values (dynamic seed functions) and function selections can be added with some hardware effort. The benefit of this additional effort is enabling the third plane of randomness within the hardware uncertainty random value generator.

Full Dynamic Mutation

As you have already read, it is inexpensive to perform "virtual" evolution of session data. Creating two random address streams within the data pool(s) and swapping the contents of these locations represents another solution referred to as full dynamic mutation. If the rate of change is low enough, there should be limited impact on overall performance.

High performance designs are most likely to demand the largest random data requirements. Each memory cycle may become very important to overall generator performance. Having the same session data loaded into multiple data pools gives a major boost in available memory bandwidth for the design. Different parts of the design could use different data pools to simultaneously overlap memory accesses. Thus, the overlapping memory accesses solve the memory bandwidth problem.

Still, while solving the memory bandwidth problem, it may be required to complete a real data pool shuffle. This can be accomplished with a second or duplicate set of data pools. While the first set of data pools is actively producing random data, the second set is being shuffled. Once the shuffle is complete and the data driven count has been reached, the "fresh" data pools are switched to become the primary data pools. The stale data pools are now free to be shuffled. This process may be repeated as often as needed.

Hardware Examples

Each of these examples represents examples showing some of the features of the uncertainty genome. Special care is taken to show the full range of the Decoupling Process used to protect the session data from the data paradox. Each of these examples produces a single uncertain random output stream. Many examples are not shown here because the number of possible solutions is unbounded with examples comprising: multiple random output streams, randomly addressable substreams (they are covered in the software examples), dynamic evolution of session data, multiple data pools, and the virtual cut and virtual shuffle.

Hardware Example 1

Figure 17:
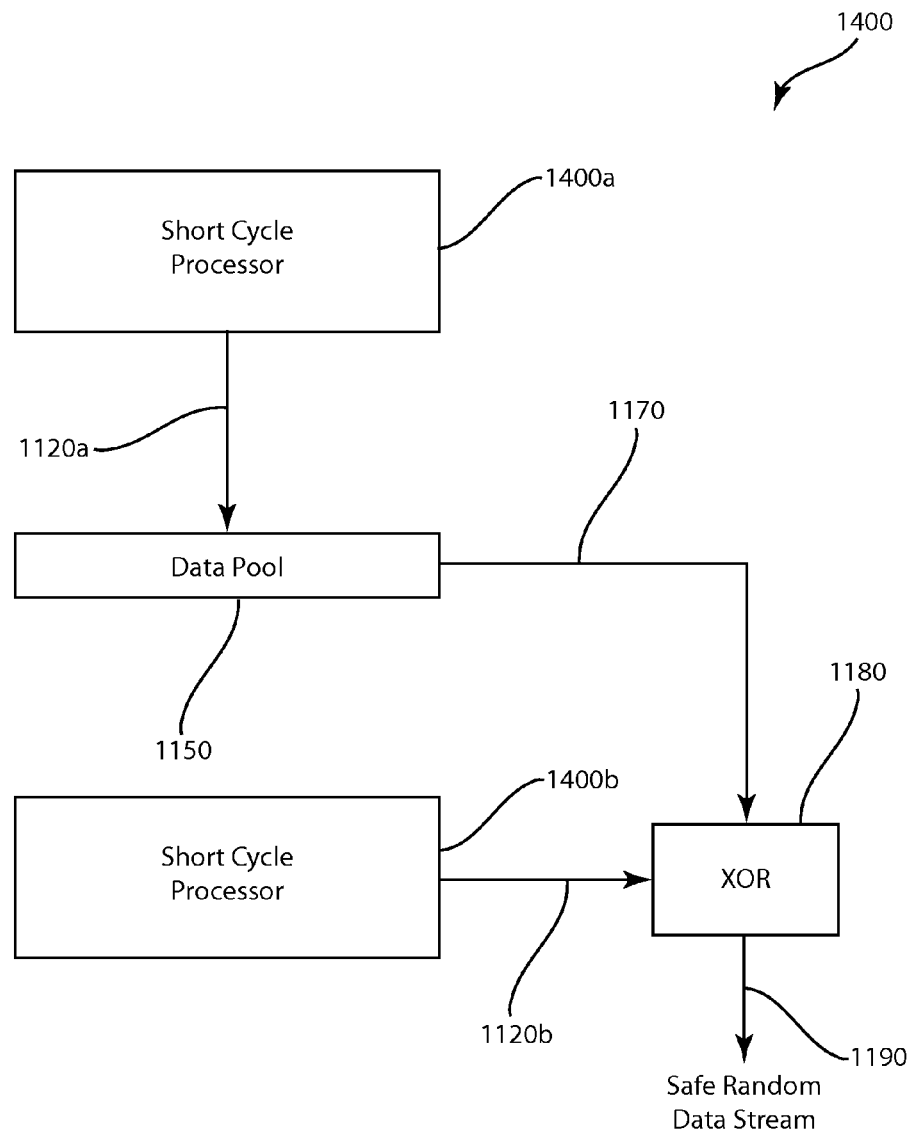
FIG. 17 is a system flow diagram depicting hardware example 1 comprised of two short cycle processes being used to create a safe random data stream according to one embodiment of the invention.

A significant part of the data paradox problem came from using pseudorandom functions to address into the data pool. The use of a short cycle process $1100a$ can also be applied to decouple data as well as addresses. FIG. 17 is a system flow diagram depicting hardware example 1 comprised of two short cycle processes $1400a$ and $1400b$ being used to create a safe random data stream 1190. A first short cycle process $1400a$ is used to create addresses $1120a$ to pull data values from a data pool 1150 creating uncertainty data 1170. The incorporation of a second short cycle process $1400b$ that creates a data stream $1120b$ to be XORed 1180 with uncertainty data 1170 provides an uncertainty random data stream 1190.

As a rule, engineering is a constant struggle of making the correct tradeoffs. For hardware example 1 these tradeoffs were made to drive the hardware cost down to a minimum. The size of the supported random data volume is undefined. Using the idea of the third plane of randomness, the control plane, we select a function within the classic block and load seed values at a much faster rate—dynamic seed functions. Often, the effect of using uncertainty data to reselect a new function becomes yet another means to decouple the addresses without additional hardware.

The following design example uses two short cycle blocks, one each for addresses and data. The pool of uncertainty (memory) and related glue is added to complete the design elements. For this example, the countdown range is 8 to 64 values. The short cycle blocks are programmable 32-bit LFSRs. Each programmable LFSR functions like eight unique LFSRs.

```
unsigned long address, data, mask, output;
address   = short_cycle_block0( );
mask      = short_cycle_block1( );
data      = data_pool[ address ];    // get uncertain data via
                relatively nondeterministic address
output    = data ^ mask;    // decouple uncertain data with relatively
uncertain mask
```

Only two Short Cycle (classic) Blocks and one memory access are required per output value, and yet all three planes of randomness, data plane, address plane, and control plane are active.

Hardware Example 2

When contrasting the short cycle process with a hybrid mask URNG process, the latter exploits the added safety of the mask generator as the decoupling process. This increased safety comes at a somewhat lower performance (the hybrid design requires more input values for three short cycle blocks). The hybrid mask process requires additional hardware elements (short cycle block and mask generator) that increase gate count. Fortunately, the added effort achieves increased production of safer random data.

```
unsigned long address, data0, data1, mask, output;
address = short_cycle_block0( );
data0   = short_cycle_block1( );
data1   = short_cycle_block2( );
mask    = data_pool[ address ];    // get uncertain mask via
                relatively nondeterministic address
// decouple relatively uncertain data with uncertain mask
output = (~mask & data0) | (mask & data1);
```

While the performance has dropped slightly from the short cycle URNG, a few obvious upgrades also apply: virtual cut/shuffle with additional uncertain data (adding paradox safety), a dedicated classic block for reading short cycle input values (increasing functional session data choices).

Hardware Example 3

Reaching the goal of a "paradox safe" URNG requires all deterministic behavior be removed from both addresses (domain values) and data (range values). The production of one nondeterministic output value requires decoupling, using a mask or chaos engine, of domain and range values. The safe URNG enables the production of very large volumes of random data. One key advantage of the safe URNG is the relaxed requirements on session data. Almost any validated session data will function correctly with the safe URNG. This might be important for applications that automatically generate unique session data.

Full classic blocks are required to guarantee maximum differentiated cycle lengths as well as good addressing coverage over the pool of uncertainty. This includes the routing of classic block outputs to any part of the design. Stepping over the initialization as an effort left to the designer, there are three major task.

Following the standard outline for each URNG: Step 1 A PRNG produces addresses to read from the pool of uncertainty, thereby producing the raw, paradox unsafe, uncertain stream that is cached in a FIFO (first in first out). Step 2 requires multiple PRNGs to produce addresses that are then decoupled to produce nondeterministic data pool addresses. These paradox safe addresses (domain values) read from the pool of uncertainty, thereby producing paradox unsafe data (range values) from it. In Step 3, the paradox unsafe data (range values) are decoupled to produce a nondeterministic output stream.

Throughout the safe URNG design, there is demand for raw uncertain data. So, we construct a FIFO to cache the values for internal use. To fill this FIFO, one classic block is assigned to generate addresses to read from the pool of uncertainty. Obviously, the size of this FIFO will be implementation dependent.

Some variations of the safe URNG use chaos engines. These engines use uncertain data as instructions. Each uncertain memory access fetches multiple instructions at a time. Therefore, the memory bandwidth demand for instructions will depend upon the number of instructions per memory read.

Generating Nondeterministic Memory Addresses

Uncertainty Function Domain Values

The following assumptions are made: Each classic block will have long enough deterministic runs to guarantee good coverage over the possible address range. The natural cycle length of the LFSR will never be reached, thereby producing a repeating sequence of values. At some point, a new seed vector will be loaded to break up the address sequences. These new seed vectors will have a relatively low rate of change. The output of these classic blocks will be used to feed one of two possible address decoupling processes: the hybrid mask generator, or address chaos engine.

For the hybrid mask generator: Two different classic blocks supply data0 and data1 values. The mask value comes from the uncertainty stream FIFO. Using these three values as input to a mask generator gives us the hybrid mask generator. We now have a means to produce nondeterministic memory addresses.

For the address chaos engine: Two different classic blocks supply the data0 and data1 values. The mask value comes from the uncertainty stream FIFO. The next instruction is taken from the uncertain instruction word. If the instruction word is empty, then a new instruction word is fetched from the uncertainty stream FIFO. Using the given instruction, data0, data1, and mask value as inputs to a chaos engine provides us with the address chaos engine. We now have a means to produce nondeterministic memory addresses.

Generating Results from the Data Decoupling Process

Uncertainty Function Range Values

Given two nondeterministic memory addresses (domain values), we read data0 and data1 (range values) from the pool of uncertainty. The mask value comes from the uncertainty stream FIFO. These three values are used in one of two ways: data mask generator or data chaos engine.
1) For the data mask generator: We obtain the standard decoupled mask generated result.
2) For the data chaos engine: The next instruction is taken from the uncertain instruction word. If the instruction word is empty, then a new instruction word is fetched from the uncertainty stream FIFO. The standard three values, data0, data1, and mask, are processed in the data chaos engine, thus producing the decoupled data result.

Given the wide range of tradeoffs, the possible implementations of the safe URNG will vary in both costs and performance. Depending on application needs, there are design upgrades to consider: virtual cut/shuffle with additional uncertain data, displacement in time, multiple copies of the pool of uncertainty, mask generator/chaos engine mix and match, etc.

Software Building Blocks

Traditionally, only a small percentage of software is executed thousands of times per second. This execution rate can and does impact the design of high performance software. To that end, care must be taken to be as reasonably efficient as possible. This sensitivity to efficiency is not a battle between the older block-structured programming style and the object paradigm. Instead, there is a careful blending of both styles to give the desired flexibility as well as performance.

Compilers are far more than a means to convert source into machine language. Any programmer appreciates finding bugs at compile-time instead of runtime. Good programmers use the source code as a means of documentation as well as implementation. This documentation is very useful for the people that must follow behind you and support your code.

In the object paradigm of programming, abstractions and their relationships are most often defined during compile-time. The breaking of the compile-time binding of relationships between abstractions and replacing it with runtime binding provides us with the necessary switch from certainty to uncertainty. Using uncertain data to drive the decision process enables a wider range of uncertainty random number generators to be dynamically configured. Seizing the advantages of innovation from both the control and data planes facilitates the dynamically re-configuration of the Uncertainty Random Value Generator at any point in time. In this way, the cracker can never model the overall system from the compiled source.

The software based Uncertainty Random Value Generator is constructed with different software components that are dynamically configured. The dynamic configuration requires collections of components from which to choose. Obviously, a greater set of possible components to select from means a substantial increase in uncertainty. Therefore, each collection must be many times the minimum number of components required for any possible configuration. This is a simple case where more components are preferable, i.e. less certain.

A distinct advantage of the object paradigm of programming makes this philosophy a logical place to start, the pool of uncertainty is used to select the process/module to be implemented at run time for a random value generator. The ideal design flexibility would be to achieve the runtime function switching without paying the object paradigm overhead. It is important that the function binding be done at runtime instead of compile time. In this way the cracker cannot easily model the overall system from the compiled source. To select which function to bind to the runtime object the process is going to be data driven from the data pools (uncertainty function).

The software building blocks now being defined are not as elegant as an object-based language and are, in fact, somewhat harder to read. However, they are very effective at runtime binding resulting in a Uncertainty Random Value Generator. Rather than a complete listing, only the required sections are explained. These interfaces are documented in the C programming language.

```
typedef r_value unsigned long;                              // random value
typedef r_value (*PRNG_function)(struct *r_value state);    // PRNG
function interface
typedef r_value (*edit_process)(r_value data0, r_value data1,
r_value mask);    // random edit process interface
```

The following assumptions are made before discussing the building blocks:
1) Which software architecture (i.e. which embodiment) has been selected.
2) The session/source/output buffer data has already been loaded into memory.
3) If reshuffled data is required, then that has also been loaded into the data pools as needed.

Table of Classic Random Functions

We are fortunate in having a number of published software functions for generating random values. While this software set is smaller than the classic hardware Linear Feedback Shift Registers (LFSR) there are still a number of good functions from which to choose. The hardware shift-registers can also be included and added to this table. The table will most likely have a mix of software-only functions and/or shift-register implementations. The table of classic random functions for software implementations comprise:
Linear congruent
Lagged Fibonacci generator Blum Blum Shub
Fortuna
Mersenne Twister
SIMD-oriented Fast Mersenne Twister
CryptGenRandom
Yarrow Algorithm
Free BSD
Park-Miller random number generator
Inversive contruential generator The table of classic random functions is formatted with three columns: the random function pointer, the cycle period length of the function, and an "in use" flag. Each function within the table produces the next single value in their "melody".

The differences between the Table Of classic Random Functions and the Classic Block comprise: having no Mask Generators and the fact that more than one entry will be used at a time. The "in use" flag will be set whenever an entry is allocated. The cycle period length is used to make certain that only one function with the same cycle length is active. In this instance of the uncertainty random value generator, between the "in use" flag and the cycle length, it is easy to ensure that only differentiated cycle lengths are being used. Note that these "stateless" functions do not have internal data. They merely take the current value and generate the next value in the sequence.

Table of Random Edit Processes

A number of random edit processes are defined within this description. The Table of Random Edit Processes holds the runtime implementations of these edit processes. Note these are also "stateless" functions that do not have internal data. These generic edit processes act as general tools to construct target embodiments. These functions are dynamically installed into a Chaos Engines as needed. Unlike the Table of classic random functions, there is no defined policy governing multiple instances of the same edit processes within one Chaos Engine. Good reasons support the use of either unique or multiple instances of the same edit process. Choosing whether to implement unique or multiple instances of any edit process is up to the designer. If multiple instances are supported, care must be taken to limit these processes to a number that does not adversely affect performance.

Rules for Allocation of Pseudorandom Generators

For allocation (or reallocation) of pseudorandom generators from the table of classic functions, the rules are simple. Active functions can only be used once per instance of the Uncertainty Random Value Generator. If these functions are allocated statically, then each active function must have a different cycle length to maximize the total run length of the edit processes. When classic functions are allocated dynamically with uncertain run lengths, two or more pseudorandom generators may be allocated with the same cycle length. The reasoning behind this is simple—the uncertain run length will likely end before the natural cycle length. Obviously, at the end of a run length, the pseudorandom generator is de-allocated, and returned to the table. A new uncertain value is then applied to select a replacement pseudorandom generator from the table.

In the configuration (or reconfiguration) process, an uncertain value may point to an already allocated pseudorandom generator. In this case, we just discard the value, and get another one until all of the required pseudorandom generators have been selected. We may seed these functions as we configure them or at the end of the allocation process. Not all possible run lengths are useful. Therefore, all run lengths must be restricted to a useful range. For example, a run length that is too short adds undue overhead and fails to give full addressing coverage over the pool of uncertainty. Conversely, a run length that is too long may exceed the natural cycle length of the pseudorandom generator.

Rules Concerning the Allocation of Edit Processes for Chaos Engines

Any given edit process can only be active once per instance of a chaos engine (diversity adds uncertainty). However, the same edit process may be active in other chaos engines to maximize uncertainty.

Each chaos engine has a run length that is loaded from the pool of uncertainty. Clearly, at the end of any run length, each edit process is de-allocated, and returned to the table. Many new uncertain values are then used to select replacement edit processes from the table. Once the chaos engine is reconstituted, a new chaos engine run length is loaded from the pool uncertainty.

Some programmers may prefer a run length for each edit process in addition to or instead of one for each chaos engine.

Examples of Chaos Engine Embodiments

In one embodiment, there is a method of generating a modular one-way function in a device and thereby producing a random-value stream for use in a device that can benefit from a random-value stream and/or a computer-readable medium having computer-executable instructions for performing a method of using a device to generate a random-value stream, the instructions comprising one or more of the steps described below.

Providing a plurality of edit modules each configured to transform values: An edit module may include one or more edit processes. An edit process may include one or more functions or transformation operations that may map values according to a pattern. Where there is a one-to-one mapping across all possible values by the edit module, the edit module is potentially reversible. Where each edit module has such a property, the entire chaos engine is potentially reversible. Functions and/or transformation operations may be as simple as a value shift (wrapping+1 operation) or may be extremely complicated and/or sophisticated functions designed for a particular purpose.

Indexing the plurality of edit modules: This may be accomplished by generating a table of edit modules and assigning each line in the table a value. Where the table values match the total possible values from the instruction stream (see below) the index may permit utilization of any and/or all of the edit modules so indexed. The table may utilize pointers or other programming tools configured to direct an operation to a desired function when the index value is generated.

Providing an instruction stream, wherein the instruction stream includes a random-value stream resulting from a one-way function: The instruction stream may be generated using any of the methods described herein for creating a random value stream resulting from a one-way function. The instruction stream is generally a series of values and, because of the nature of the stream, advantageously provides a means for selecting from available edit modules in a manner that may not be predicted without the appropriate information.

Providing a value stream, including a series of values: The value stream may include any values desired to be transformed by the engine. The value stream may include random values or non-random values and/or any combination thereof. The value stream may be derived from non-random information, such as but not limited to stored data, transmitted data, encapsulated data, protocol information, and the like.

Selecting a value from the value stream, thereby generating a selected value: This may be accomplished by merely storing the first (or current or next) value in the value stream in a memory cell of a computing device, wherein the memory cell stores the value configured to be the object of a subsequent edit process. The value may be selected using more intricate and/or sophisticated techniques configured for a particular result. As a non-limiting example, the step may include successively selecting every other value of the value stream. As another non-limiting example, the step may include resetting a memory cell address to an address already including a value of the value stream.

Selecting, by use of a computing device, one of the plurality of edit modules according to a logical association between instruction stream values and the index: Edit module selection may occur in a manner similar to that of value selection described above. The value of the value stream may be similarly selected. There may be a one-to-one correspondence between instruction stream values and the logically associated index values. In one embodiment, the domain of instruction stream values is identical to the range of index values and the logical association may be of identity (example: x=y, instruction stream values 0-9 correspond with index values 0-9). In another embodiment, the logical association may be degenerate and/or may be based on a function different from simple identity.

Transforming the selected value to a transformed value by operation of the selected edit module: A memory cell containing the value may be altered to contain the new transformed value. The transformed value may, in some cases for some values and/or some edit modules, be identical to the value. In another embodiment, a pointer-type software tool, directed to a memory cell may be altered to "point" to a memory cell containing the transformed value.

Repeating one or more steps described above thereby generating a random-value stream: Which steps are repeated and in which order they are repeated will impact the operation of the engine. In one non-limiting example, the following steps are performed in the order indicated: first, selecting a value from the value stream; second, selecting one of the plurality of edit modules, and, third, transforming the value. All other combination and permutations of the above steps, including repeating one or more steps in different orders, are considered and may or may not be appropriate according to the desired function of the chaos engine.

The plurality of edit modules may include a function and/or associated seed vector and/or further comprising the step of incrementing the seed vector when the function is utilized to transform a value. The plurality of edit modules may include only functions and/or associated seed vectors and/or may further comprise the step of incrementing each associated seed vector when each function is utilized to transform a value.

The step of indexing may include assigning each of the plurality of edit modules a memory cell that may be addressed according to a domain value wherein any given domain value maps to all possible range values.

The instruction stream may be an output of one or more steps described above performed by a different module.

In one embodiment, one of the edit modules may include performance of one or more previously described steps by a different module.

There may be a step of restricting the selectable edit modules to a smaller subset of the total pool of available edit modules. The step of restricting may include randomly selecting a limited number of edit modules thereby generating a subset and generating data sufficient to limit selection of edit modules to those of the subset.

In one embodiment, there may be a step of repeating a selection step to select a second edit module and transforming the transformed value by operation of the second edit module thereby forming a multi-transformed value by operation of stacked edit modules.

There may be a random value generation system configured to automatically generate a stream of random values usable by a device that may benefit from such, the system comprising one or more of the following: a plurality of indexed edit modules each configured to transform a value; an instruction stream module configured to provide a random-value stream resulting from a one-way function; a value stream module configured to provide a series of values; a computing device in communication with each of the plurality of indexed edit modules, the instruction stream module, and the value stream module and configured to select one of the plurality of indexed edit modules according to a logical association between a value of the instruction stream and the index and instruct the edit module to transform a value of the value stream module.

The Uncertainty Start Value

A Public Value

The seed value for most classic random functions must be protected, because this private value represents a key to start the random sequence. The protection of this "secret key" value can be a challenge in some cases.

The Start Value for an uncertainty random value generator does not require such protection because the value is only a data pool memory offset. All of the protected values are in the data pool itself, not the public offset into the data pool. The initialization process of the uncertainty random value generator begins with a temporary classic function seeded by the data pool value found at the data pool memory offset start value. As a non-secret value, the start value can be made visible to anybody without risk.

By utilizing this temporary classic function to read the data pool, all other initialization values come from the pool of uncertainty. To configure the uncertainty random value generator, the start value cannot imply which initialization values were used. Once the initialization process is complete, the public start value is never used again and the temporary classic function is discarded.

Software Examples

The aggressive use of the control plane to dynamically reselect new software components has the effect of removing additional deterministic behavior, thereby adding uncertainty. This added uncertainty carries relatively little overhead for its benefits. The advantages/disadvantages of software over hardware are well recognized. Software implementations are always slower than hardware implementations, but they do add much greater flexibility.

One can make the following assumptions: very high performance and/or voluminous random data requirements are more likely to apply hardware implementations. Very modest random data requirements can be solved by traditional PRNGs. Software based URNGs are best suited for applications that don't require hardware attributes, but still require the other URNGs features. All of the provided software examples of URNG are paradox safe and (should) therefore function correctly for all validated session data.

Software Example 1

Software example 1, the mask URNG, uses mask generators to decouple both address (domain values) and data (range values) of the uncertainty function. In this way, the output value is paradox safe because all addresses and data are nondeterministic. Like the hardware examples, the initialization effort is left to the developer. Below is example code to illustrate the operation of software example 1:

```c
// C header definitions
#define CHAOS_TABLE_MAX_INDEX    16
#define INSTRUCTIONS_PER_WORD    8
#define INSTRUCTION_MASK         0xF
#define INSTRUCTION_SHIFT        4
typedef     unsigned long    r_value;    // base type of uncertainty values
typedef unsigned long t_data_pool;
// generic PRNG functioin
typedef r_value (*PRNG_function)(r_value* state);
// generic Random Edit Process
typedef r_value (*edit_process)(r_value, r_value, r_value);
///////////////////////////////////////////////////////////////
//
// STRUCTURE : t_chaos_cpu
//
// Chaos CPU
//             HAS
//                 instruction (block) currently 4 bits each
//                 PC Program Counter within instruction block
//                 16 CPU operations indexed via 4 bit instruction
//                 each operation is a generic Random Edit Processes
//                 each operation is randomly selected via uncertainty value from REPtable
//
// Since each instruction block is randomly fished from pool of uncertainty and then
// used to perform random operations against other random streams. The Chaos Engine
// is truly named correctly.
//
///////////////////////////////////////////////////////////////
typedef struct
{
    r_value         instruction; // random value holding 8 instructions
    unsigned long PC;          // current instruction counter within above value
                               // table of chaos operations (Random Edit Processes)
    edit_process    operation[CHAOS_TABLE_MAX_INDEX];
} t_chaos_cpu;
///////////////////////////////////////////////////////////////
//
// STRUCTURE : t_uncertainty_state
//
// state info for configuration (or re-configuraton)
//
///////////////////////////////////////////////////////////////
typedef struct
{
    unsigned long   max_pool_index;   // maxinum data pool index
    t_data_pool     *data_pool;       // data pool pointer
    PRNG_function       PRNG0;
    r_value             PRNG0_state;
    PRNG_function       PRNG1;
    r_value             PRNG1_state;
    PRNG_function       PRNG2;
    r_value             PRNG2_state;
    PRNG_function       PRNG3;
    r_value             PRNG3_state;
    PRNG_function       PRNG4;
    r_value             PRNG4_state;
    PRNG_function       PRNG5;
    r_value             PRNG5_state;
    PRNG_function       PRNG6;
    r_value             PRNG6_state;
    PRNG_function       PRNG7;
    r_value             PRNG7_state;
    t_chaos_cpu         cpuAdr0;
    t_chaos_cpu         cpuAdr1;
    t_chaos_cpu         cpudata;
} t_uncertainty_state;
//
// Notes to programmer
//
// This is not a working example. It is more or less an outline, so some details have been skipped.
// For example, each function pointer has been allocated during the initialization step.
// The run length selection/reselection process is not covered in this example.
// The max_pool_index is the maximum index of the pool of uncertainty for this instance
```

```
of the URNG.
// This index is a dynamic value for each unique session data.
//
// t_uncertainty_state contains all PRNG function pointers, each PRNG state,
// the pointer to the data_pool (the pool of uncertainty), and max_pool_index
//
//
// The get_uncertain_value is the entry point to get the next uncertain value from the
URNG
//
///////////////////////////////////////////////////////////////////
//
// FUNCTION : get_uncertain_value
//
// Get nondeterministic random value based on mask generator decouple
//
///////////////////////////////////////////////////////////////////
r_value get_uncertain_value (t_uncertainty_state *state)
{
    unsigned long unsafe_adr1, unsafe_adr2, safe_adr1, safe_adr2, mask1, mask2, mask3;
    //
    // Pull three unsafe mask values from the state data pool based on the
    // PRNG functions and their previous state values.
    //
    mask1 = state->data_pool[(*state->PRNG1)( &state->PRNG1_state ) % state-
>max_pool_index];
    mask2 = state->data_pool[(*state->PRNG2)( &state->PRNG2_state ) % state-
>max_pool_index];
    mask3 = state->data_pool[(*state->PRNG3)( &state->PRNG3_state ) % state-
>max_pool_index];
    //
    // Decouple unsafe (deterministic) addresses with mask generators to create two
    // safe (nondeterministic) data pool addresses. These safe (nondeterministic)
    // addresses become domain values to the uncertainty function.
    //
    unsafe_adr1 = (*state->PRNG4)( &state->PRNG4_state );
    unsafe_adr2 = (*state->PRNG5)( &state->PRNG5_state );
    safe_adr1 = (~mask1 | unsafe_adr1) & (mask1 | unsafe_adr2) % state-
>max_pool_index;
    unsafe_adr1 = (*state->PRNG6)( &state->PRNG6_state );
    unsafe_adr2 = (*state->PRNG7)( &state->PRNG7_state );
    safe_adr2 = (~mask2 | unsafe_adr1) & (mask2 | unsafe_adr2) % state-
>max_pool_index;
    //
    //          Using mask generator to decouple range values from uncertainty
function
    //
    return (~mask3 | state->data_pool[safe_adr1]) & (mask3 | state-
>data_pool[safe_adr2]);
};
```

In some form, the mask URNG will represent the most common solutions for software applications. While it will never be as fast as a simple PRNG, it does offer good performance for the URNG feature set. There are obvious design upgrades to consider: virtual cut/shuffle with additional uncertain data, and displacement in time. The cycle length for the mask URNG is so large that it is unlikely to repeat in the user's lifetime. Therefore, the chaos URNG is only covered to complete the possible software examples.

Software Example 2

Software example 2, the chaos URNG, uses chaos engines to decouple both addresses and data. Like the mask URNG, the output value is paradox safe because all addresses (domain values) and data (range values) are nondeterministic. Like the hardware examples, the initialization effort is left to the developer. Below is example code to illustrate the operation of software example 1:

```
// This is not a working example. It is more or less an outline, so some details have been
skipped.
// For example, each function pointer has been allocated during the initialization step.
// The run length selection/reselection process is not covered in this example.
// The max_pool_index is the maximum index of the pool of uncertainty for this instance
of the URNG.
// This index is a dynamic value for each unique session data.
//
// t_uncertainty_state contains all PRNG function pointers, each PRNG state,
// all chaos engine pointers (with each chaos engine is all random edit process function
pointers),
// the pointer to the data_pool (the pool of uncertainty), and max_pool_index
//
```

```
////////////////////////////////////////////////////////////////////
//
// FUNCTION : get_next_instruction
//
// returns the next chaos engine instruction
//
// notes: PRNG0 is only used for addressing instructions in the data pool
//        PC is program counter within the cpu instruction word
//   obviously, instructions per chaos engine is a power of 2
//
////////////////////////////////////////////////////////////////////
unsigned long get_next_instruction (t_uncertainty_state *state, t_chaos_cpu *cpu)
{
                unsigned long     instr;
                r_value                            instruction;
                instruction = cpu->instruction;              // create local copy
                if (cpu->PC >= INSTRUCTIONS_PER_WORD)        // current word empty, get new one
                {
                    instruction = state->data_pool[(*state->PRNG0)(&state->PRNG0_state) % state->max_pool_index];
                    cpu->PC = 0;                             // reset to start of word
                }
                instr      = instruction & INSTRUCTION_MASK; // slice off instruction from word
                cpu->instruction = instruction >> INSTRUCTION_SHIFT;// move forward to next instruction
                cpu->PC++;
                return instr;
};
////////////////////////////////////////////////////////////////////
//
// FUNCTION : get_uncertain_value
//
// Get nondeterministic random value based on chaos engine decouple
//
////////////////////////////////////////////////////////////////////
r_value get_uncertain_value2 (t_uncertainty_state *state)
{
   unsigned long unsafe_adr1, unsafe_adr2, safe_adr1, safe_adr2, mask1, mask2, mask3, instr;
   //
   // Pull three unsafe mask values from the state data pool based on the
   // PRNG functions and their previous state values.
   //
   mask1 = state->data_pool[(*state->PRNG1)( &state->PRNG1_state ) % state->max_pool_index];
   mask2 = state->data_pool[(*state->PRNG2)( &state->PRNG2_state ) % state->max_pool_index];
   mask3 = state->data_pool[(*state->PRNG3)( &state->PRNG3_state ) % state->max_pool_index];
   //
   // Decouple unsafe (deterministic) addresses with address chaos engines to create two
   // safe (nondeterministic) data pool addresses. These safe (nondeterministic) addresses
   // become domain values to the uncertainty function
   //
   unsafe_adr1 = (*state->PRNG4)( &state->PRNG4_state );
   unsafe_adr2 = (*state->PRNG5)( &state->PRNG5_state );
   instr   = get_next_instruction( state, &state->cpuAdr0 );
   safe_adr1 = (*state->cpuAdr0.operation[instr])(unsafe_adr1,unsafe_adr2,mask1) % state->max_pool_index;
   unsafe_adr1 = (*state->PRNG6)( &state->PRNG6_state );
   unsafe_adr2 = (*state->PRNG7)( &state->PRNG7_state );
   instr   = get_next_instruction( state, &state->cpuAdr1 );
   safe_adr2 = (*state->cpuAdr1.operation[instr])(unsafe_adr1,unsafe_adr2,mask2) % state->max_pool_index;
   //
   //           Using data chaos engines to decouple range values from uncertainty function
   //
   instr   = get_next_instruction( state, &state->cpudata );
   return (*state->cpudata.operation[instr])(state->data_pool[safe_adr1],state->data_pool[safe_adr2],mask3);
};
```

Digital Rights Management (DRM)

There are many reasons why the current DRM designs are problematic. As they are currently designed, they only work after a fashion, because they only solve part of the problem. Current DRM designs are unique standalone solutions that don't interact well with others. The current DRM is too complex because it depends on successfully obscuring many internal secrets. Using a public lock based DRM means that you must keep the private keys a secret. More precisely, the big secret to protect is how one conceals these private keys. The need for secrecy is self-evident given the vulnerabilities of the current technology. However, this same reliance on secrecy also blocks interoperability with products or services from other companies. This point is easy to understand: how can you share a secret and still maintain its integrity?

Defending the essential big secret can be described as an arms race between the DRM designer and the hacker. Trying to conceal the private keys to the public lock is inevitably incomplete so long as the linchpin of a DRM presents a single, inviting, and potentially devastating target. In a cost-benefit analysis of attacking this DRM, the rewards of breaking the secret continue to outweigh the minimal risks and relative effort involved. Each time the hacker discovers the big secret; the result is a single key that unlocks all the music.

To escape the weaknesses of the current technology, the economics of this game must change. We switch to a new technology that relies on private locks. Giving each person a private lock means we can use public keys. Thus, we no longer have to conceal the public keys within the DRM. Even if a private lock is picked, only one door is opened, while all other doors remain locked. The rewards for breaking the private lock are very low compared to the public lock. Using a private lock means the damage from a picked lock is self-limiting. While it is just as difficult to crack a big secret as a little secret, the loss of a big secret proves devastating while the loss of a little secret among millions remains negligible.

Another very important advantage with private locks is they support full interoperability. Each vendor can use a different private lock for his or her media sales. At no point in time, does anyone know more than a little secret. This technology is so simple; it uses the same hardware and/or software implantation to deliver a unique little secret solution to each person. The private lock in the above discussion is the uncertainty random value generator disclosed herein. Each person is given their own private function to unlock their media and each media device is loaded with this private function allowing a person fair use of all their media. Each media purchased is supplied with a public key that allows the owner to unlock, decrypt, the media on all their media devices. The process of DRM would work similar to the MAC process described in FIG. 22. Each user consumer would have their own private function and unique keys would be shipped with each media purchased. The consumer would have the same private function in each of their media device to authenticate and decrypt the media.

Any of the functions, features, benefits, structures, and etc. described herein may be embodied in one or more modules. Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of programmable or executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module and/or a program of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The various system components and/or modules discussed herein may include one or more of the following: a host server or other computing systems including a processor for processing digital data; a memory coupled to said processor for storing digital data; an input digitizer coupled to the processor for inputting digital data; an application program stored in said memory and accessible by said processor for directing processing of digital data by said processor; a display device coupled to the processor and memory for displaying information derived from digital data processed by said processor; and a plurality of databases. Various databases used herein may include: compressed data in all forms; and/or like data useful in the operation of the present invention. As those skilled in the art will appreciate, any computers discussed herein may include an operating system (e.g., Windows Vista, NT, 95/98/2000, OS2; UNIX; Linux; Solaris; MacOS; and etc.) as well as various conventional support software and drivers typically associated with computers. The computers may be in a home or business environment with access to a network. In an exemplary embodiment, access is through the Internet through a commercially-available web-browser software package.

The present invention may be described herein in terms of functional block components, screen shots, user interaction, optional selections, various processing steps, and the like. Each of such described herein may be one or more modules in exemplary embodiments of the invention. It should be appreciated that such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, the software elements of the present invention may be implemented with any programming or scripting language such as C, C++, Java, COBOL, assembler, PERL, Visual Basic, SQL Stored Procedures, AJAX, extensible markup language (XML), with the various algorithms being implemented with any combination of data structures, objects, processes, routines or other programming elements. Further, it should be noted that the present invention may employ any number of conventional techniques for data transmission, signaling, data processing, network control, and the like. Still further, the invention may detect or prevent security issues with a client-side scripting language, such as JavaScript, VBScript or the like.

Additionally, many of the functional units and/or modules herein are described as being "in communication" with other functional units and/or modules. Being "in communication" refers to any manner and/or way in which functional units and/or modules, such as, but not limited to, computers, laptop computers, PDAs, modules, and other types of hardware and/or software, may be in communication with each other. Some non-limiting examples include communicating, sending, and/or receiving data and metadata via: a network, a wireless network, disk drives, media players, cell phones, network connections, hardware locks, DNA sequencers, fingerprint scanners, retina scanners, digital cameras, software, instructions, circuitry, phone lines, internet lines, satellite signals, electric signals, electrical and magnetic fields and/or pulses, and/or so forth.

As used herein, the term "network" may include any electronic communications means which incorporates both hardware and software components of such. Communication among the parties in accordance with the present invention may be accomplished through any suitable communication channels, such as, for example, a telephone network, an extranet, an intranet, Internet, point of interaction device (point of sale device, personal digital assistant, cellular phone, kiosk, etc.), online communications, off-line communications, wireless communications, transponder communications, local area network (LAN), wide area network (WAN), networked or linked devices and/or the like. Moreover, although the invention may be implemented with TCP/IP communications protocols, the invention may also be implemented using IPX, Appletalk, IP-6, NetBIOS, OSI or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997), the contents of which are hereby incorporated by reference.

It is understood that the above-described preferred embodiments are only illustrative of the application of the principles of the present invention. The present invention may be embodied in other specific forms without departing from its spirit or essential characteristics. The described embodiment is to be considered in all respects only as illustrative and not restrictive. The scope of the invention is, therefore, indicated by the appended claim rather than by the foregoing description. All changes which come within the meaning and range of equivalency of the claims are to be embraced within their scope.

Thus, while the present invention has been fully described above with particularity and detail in connection with what is presently deemed to be the most practical and preferred embodiment of the invention, it will be apparent to those of ordinary skill in the art that numerous modifications, including, but not limited to, variations in size, materials, shape, form, function and manner of operation, assembly and use may be made, without departing from the principles and concepts of the invention as set forth in the claims. Further, it is contemplated that an embodiment may be limited to consist of or to consist essentially of one or more of the functions, features, structures, and/or methods described herein.

What is claimed is:

1. A method of generating a modular one-way function in a device and thereby producing a random-value stream for use in a device that can benefit from a random-value stream, comprising:
    a) providing a plurality of edit modules each configured to transform values;
    b) indexing the plurality of edit modules;
    c) providing an instruction stream, wherein the instruction stream includes a non-deterministic random-value stream resulting from a true one-way function;
    d) providing a value stream, including a series of values;
    e) selecting a value from the value stream, thereby generating a selected value;
    f) selecting, by use of a computing device, one of the plurality of edit modules according to a logical association between an instruction stream value and the index;
    g) transforming the selected value to a transformed value by operation of the selected edit module;
    h) repeating steps e), f) and g) thereby generating a random-value stream.

2. The method of claim 1, wherein the plurality of edit modules includes a function and associated seed vector and further comprising the step of incrementing the seed vector when the function is utilized to transform the selected value.

3. The method of claim 1, wherein the plurality of edit modules includes only functions and associated seed vectors and further comprises the step of incrementing each associated seed vector when each function is utilized to transform the selected value.

4. The method of claim 1, wherein the step of indexing includes assigning each of the plurality of edit modules a memory cell addressed according to a domain value wherein any given domain value maps to all possible range values.

5. The method of claim 1, wherein the instruction stream is an output of steps a) through f) performed by a different module.

6. The method of claim 1, wherein one of the edit modules comprises performance of steps a) through f) by a different module.

7. The method of claim 1, further comprising the step of restricting the selectable edit modules to a smaller subset of the total pool of available edit modules.

8. The method of claim 7, wherein the step of restricting includes randomly selecting a limited number of edit modules thereby generating a subset and generating data sufficient to limit selection of edit modules to those of the subset.

9. The method of claim 1, further comprising repeating step f) to select a second edit module and transforming the transformed value by operation of the second edit module thereby forming a multi-transformed value by operation of stacked edit modules.

10. A computer-readable medium having computer-executable instructions for performing a method of using a device to generate a random-value stream, the instructions comprising the steps of:
    a) providing a plurality of edit modules each configured to transform values;
    b) indexing the plurality of edit modules;
    c) providing an instruction stream, wherein the instruction stream includes a non-deterministic random-value stream resulting from a true one-way function;

d) providing a value stream, including a series of values;
e) selecting a value from the value stream, thereby generating a selected value;
f) selecting, by use of a computing device, one of the plurality of edit modules according to a logical association between an instruction stream value and the index;
g) transforming the selected value to a transformed value by operation of the selected edit module;
h) repeating steps e), f) and g) thereby generating a random-value stream.

11. The medium of claim 10, wherein the plurality of edit modules includes a function and associated seed vector and further comprising the step of incrementing the seed vector when the function is utilized to transform a value.

12. The medium of claim 10, wherein the plurality of edit modules includes only functions and associated seed vectors and further comprises the step of incrementing each associated seed vector when each function is utilized to transform a value.

13. The medium of claim 10, wherein the step of indexing includes assigning each of the plurality of edit modules a memory cell addressed according to a domain value wherein any given domain value maps to all possible range values.

14. The medium of claim 10, wherein the instruction stream is an output of steps a) through f) performed by a different module.

15. The method of claim 10, wherein one of the edit modules comprises performance of steps a) through f) by a different module.

16. The method of claim 10, further comprising the step of restricting the selectable edit modules to a smaller subset of the total pool of available edit modules.

17. The medium of claim 16, wherein the step of restricting includes randomly selecting a limited number of edit modules thereby generating a subset and generating data sufficient to limit selection of edit modules to those of the subset.

18. The medium of claim 10, further comprising repeating step f) to select a second edit module and transforming the transformed value by operation of the second edit module thereby forming a multi-transformed value by operation of stacked edit modules.

19. A random value generation system configured to automatically generate a stream of random values usable by a device that may benefit from such, the system comprising:
a) a plurality of indexed edit modules each configured to transform values;
b) an instruction stream module configured to provide a non-deterministic random-value stream resulting from a true one-way function;
c) a value stream module configured to provide a series of values;
d) a computing device in communication with each of the plurality of indexed edit modules, the instruction stream module, and the value stream module and configured to select one of the plurality of indexed edit modules according to a logical association between a value of the instruction stream and the index and instruct the edit module to transform a selected value of the value stream module.

* * * * *